United States Patent
Petruzzi

(10) Patent No.: US 7,917,415 B1
(45) Date of Patent: Mar. 29, 2011

(54) USER INTERFACE FOR RETIREMENT ADMINISTRATION AND DISTRIBUTION SYSTEM

(75) Inventor: Albert A. Petruzzi, Cambria, CA (US)

(73) Assignee: San Luis Obispo County Pension Trust Board of Trustees, San Luis Obispo, CA (US)

( * ) Notice: Subject to any disclaimer, the term of this patent is extended or adjusted under 35 U.S.C. 154(b) by 91 days.

(21) Appl. No.: 11/821,835

(22) Filed: Jun. 25, 2007

(51) Int. Cl.
*G06Q 40/00* (2006.01)

(52) U.S. Cl. .......................................... 705/35; 705/30

(58) Field of Classification Search ............... 705/10–44
See application file for complete search history.

(56) References Cited

U.S. PATENT DOCUMENTS

| | | | | |
|---|---|---|---|---|
| 4,750,121 A * | 6/1988 | Halley et al. | ..................... | 705/35 |
| 6,401,079 B1 * | 6/2002 | Kahn et al. | ....................... | 705/30 |
| 6,604,080 B1 * | 8/2003 | Kern | ................................. | 705/4 |
| 7,305,347 B1 * | 12/2007 | Joao | ................................... | 705/4 |
| 7,636,665 B2 * | 12/2009 | Cooperstone et al. | ......... | 705/1.1 |
| 7,739,131 B1 * | 6/2010 | Luedtke | ............................ | 705/4 |
| 2002/0022982 A1 * | 2/2002 | Cooperstone et al. | ............ | 705/7 |
| 2003/0074311 A1 * | 4/2003 | Saylors et al. | .................. | 705/39 |

* cited by examiner

*Primary Examiner* — Frantzy Poinvil
(74) *Attorney, Agent, or Firm* — Blakely Sokoloff Taylor & Zafman, LLP

(57) ABSTRACT

An embodiment of the present invention is a retirement administration and distribution system. A user interface (UI) module is coupled to at least one of a client administering module, a communication interface, an account manager, an employment and payroll interface, a self-service Website, and a business rule processing module to interact with an operator through a set of UI functions in a session related to accounts and retirement benefits of a plurality of customers. At least one of the UI functions includes a UI action and a UI display. An employment and payroll database is coupled to the employment and payroll interface to store employment and payroll information of the customers used by the UI module.

36 Claims, 16 Drawing Sheets

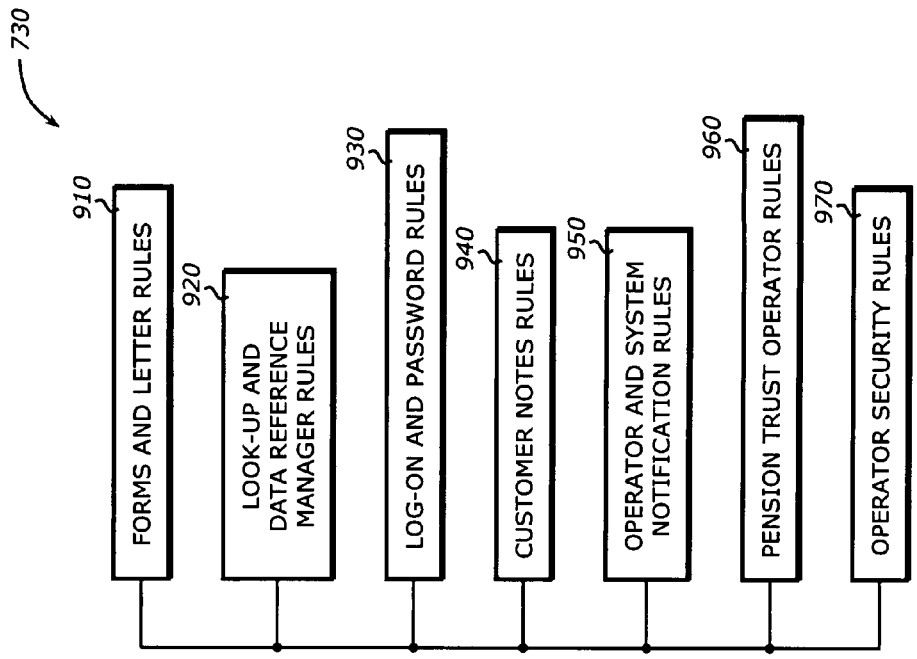
FIG. 9
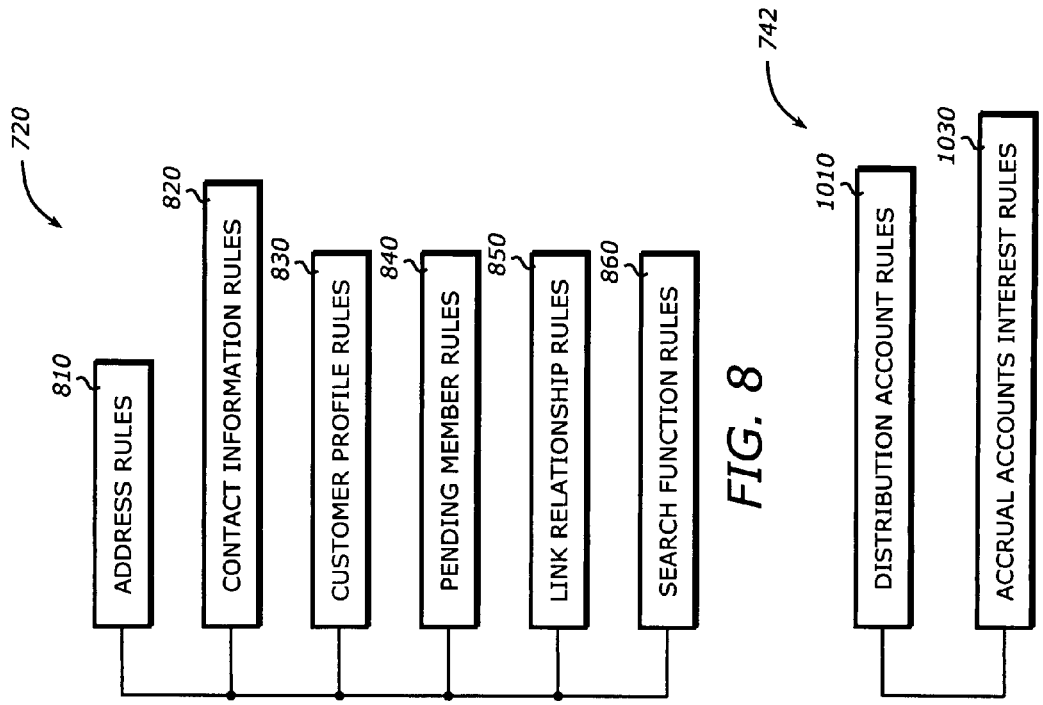
FIG. 8
FIG. 10

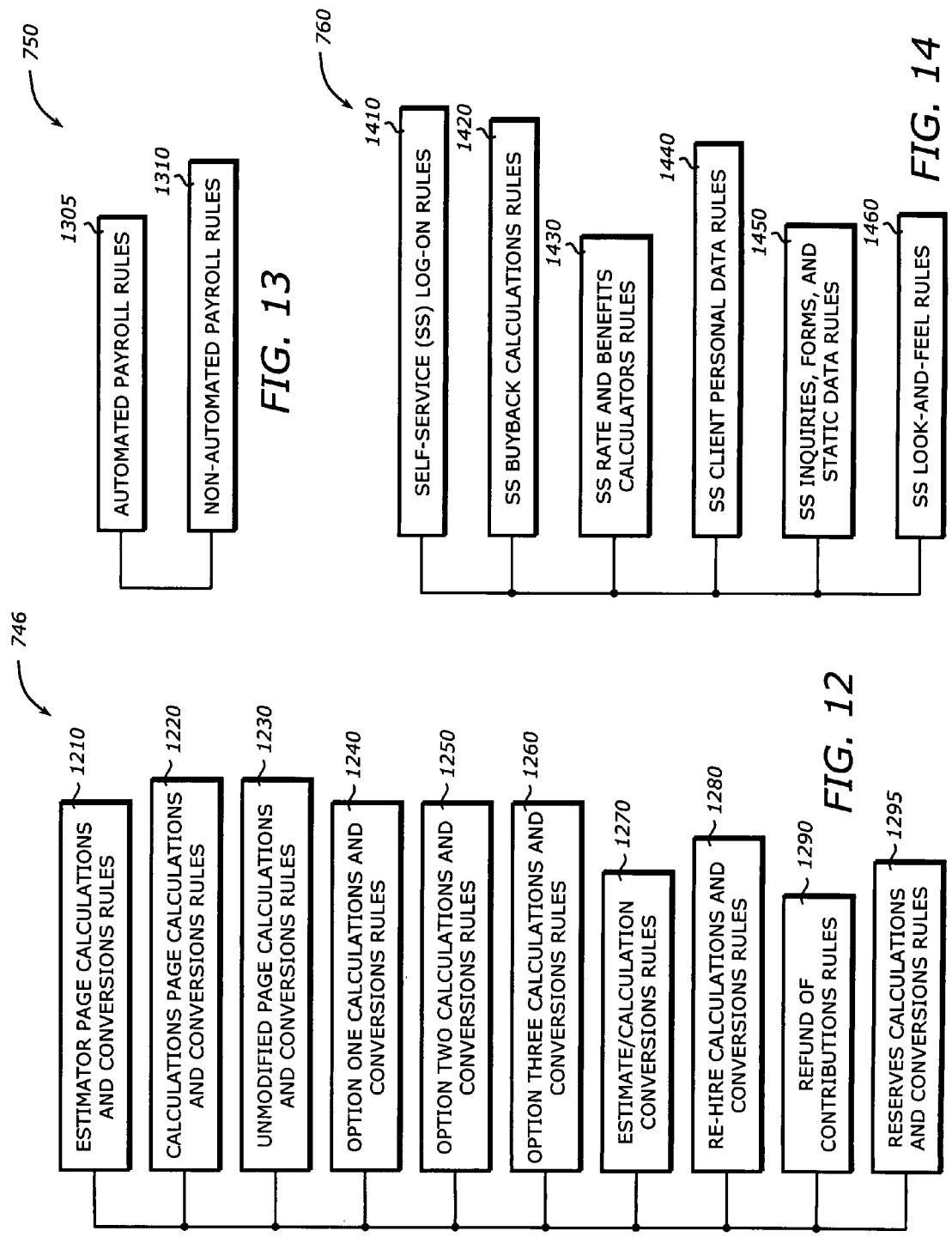

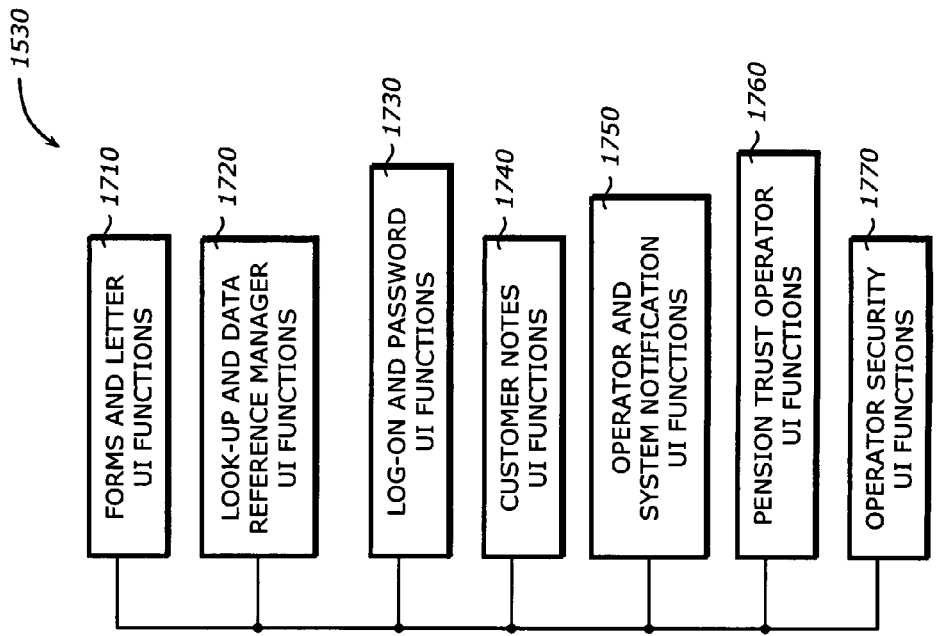
FIG. 17
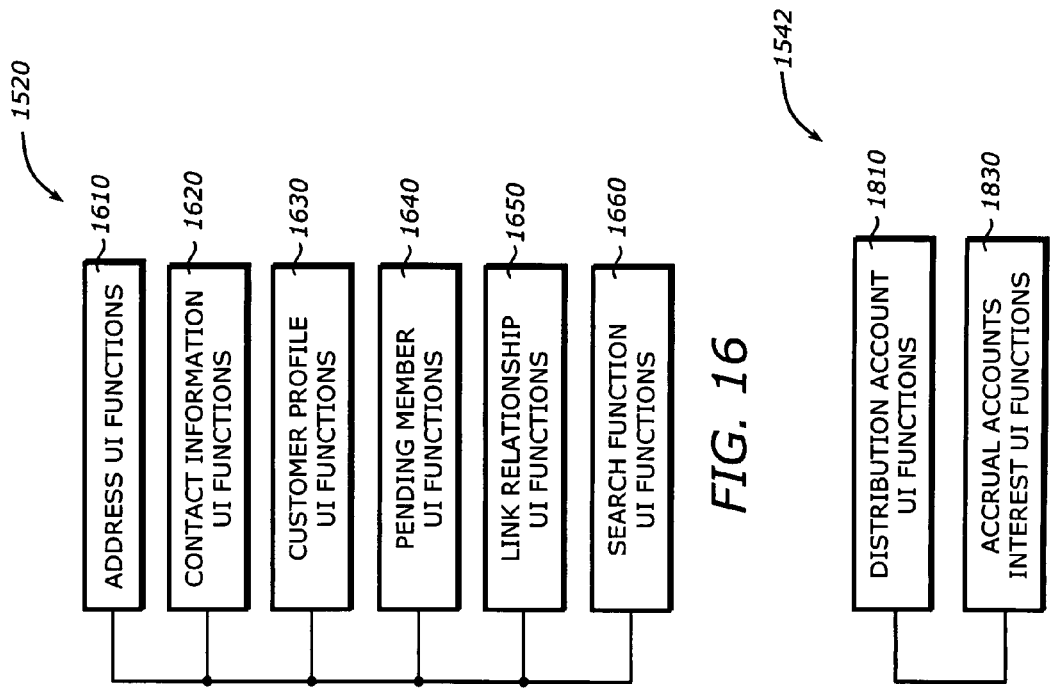
FIG. 16
FIG. 18

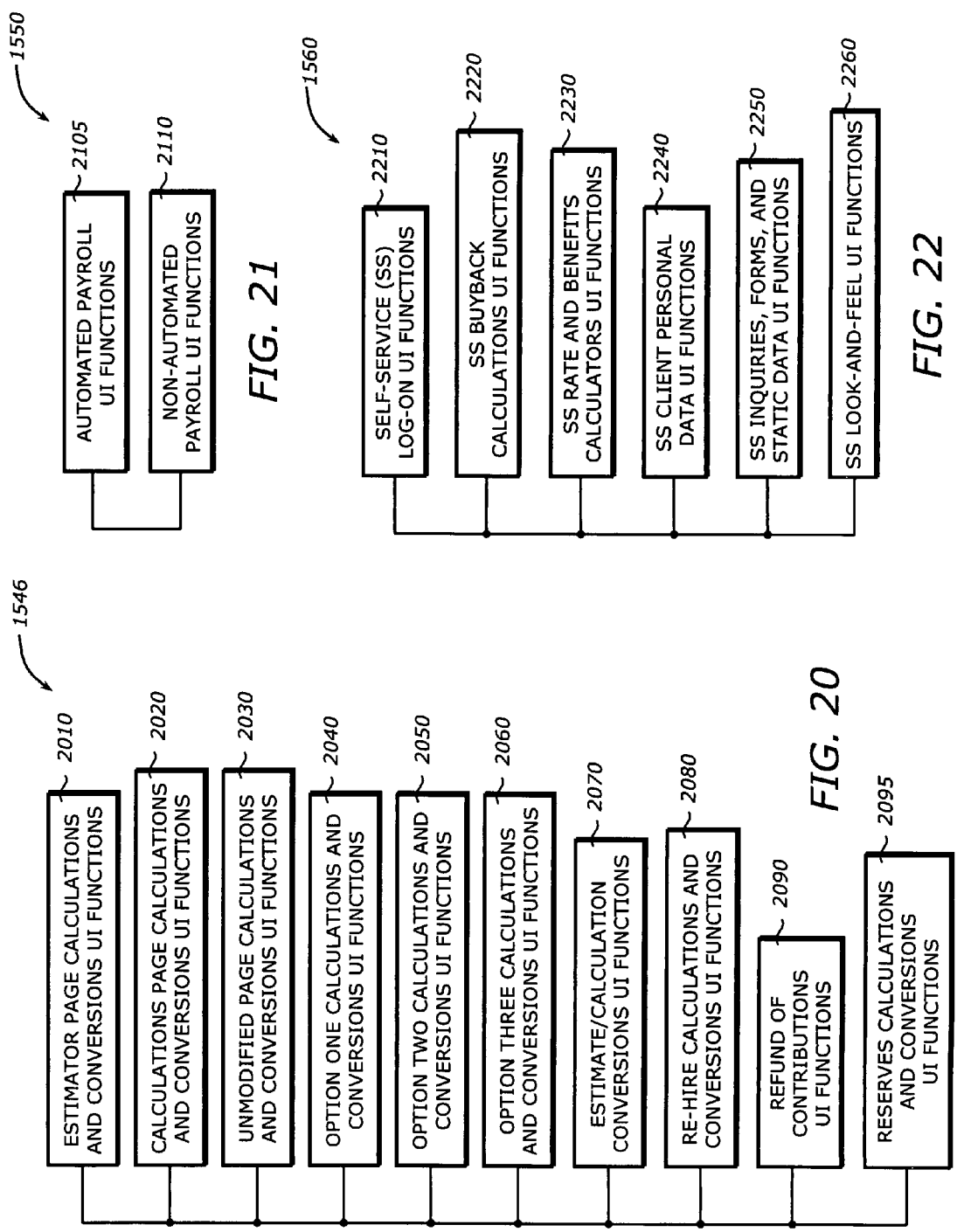

US 7,917,415 B1

USER INTERFACE FOR RETIREMENT ADMINISTRATION AND DISTRIBUTION SYSTEM

BACKGROUND

1. Field of the Invention

Embodiments of the invention relate to the field of financial systems, and more specifically, to retirement systems.

2. Description of Related Art

Public pension and retirement systems have changed dramatically in the past decades due to a number of factors including changes, revisions, or reforms in legislative regulations, social security system, tax laws, health care management, investment opportunities, demography, employment, and the general economy. Pension administrators face increased difficulties in managing and distributing benefits and funds for participants. Software developers have attempted to develop software systems addressing the needs of pension systems.

Existing techniques to provide retirement administration and distribution have a number of drawbacks. One technique provides a generic architecture with configurability. This technique, however, does not integrate accrual and distribution functions completely and does not provide the flexibility to access the functions for update or tracking at the administrative level. Other techniques are difficult to maintain and manage, typically requiring the skills of software personnel to perform maintenance tasks.

SUMMARY OF THE INVENTION

An embodiment of the present invention is a retirement administration and distribution system. A client administering module administers clients using a set of client business rules. The clients include at least an operator and a plurality of customers. An account manager administers accounts and process retirement benefits of the customers. A communication interface exports and receives communication data related to the accounts and the retirement benefits of the customers.

A business rule processing module is coupled to at least one of a client administering module, a communication interface, an account manager, an employment and payroll interface, and a self-service Website to apply a set of business rules related to accounts and retirement benefits of a plurality of customers to process a transaction.

A user interface (UI) module is coupled to at least one of a client administering module, a communication interface, an account manager, an employment and payroll interface, a self-service Website, and a business rule processing module to interact with an operator through a set of UI functions in a session related to accounts and retirement benefits of a plurality of customers. At least one of the UI functions includes a UI action and a UI display.

An employment and payroll database is coupled to the employment and payroll interface to store employment and payroll information of the customers used by the business rule processing module and/or the UI module.

BRIEF DESCRIPTION OF THE DRAWINGS

Embodiments of invention may best be understood by referring to the following description and accompanying drawings that are used to illustrate embodiments of the invention. In the drawings:

FIG. 8 is a diagram illustrating a set of client business rules according to one embodiment of the invention.

FIG. 9 is a diagram illustrating a set of communication business rules according to one embodiment of the invention.

FIG. 10 is a diagram illustrating a set of accrual business rules according to one embodiment of the invention.

FIG. 12 is a diagram illustrating a set of retirement business rules according to one embodiment of the invention.

FIG. 13 is a diagram illustrating a set of employment and payroll business rules according to one embodiment of the invention.

FIG. 14 is a diagram illustrating a set of self-service business rules according to one embodiment of the invention.

FIG. 16 is a diagram illustrating a set of client UI functions according to one embodiment of the invention.

FIG. 17 is a diagram illustrating a set of communication UI functions according to one embodiment of the invention.

FIG. 18 is a diagram illustrating a set of accrual UI functions according to one embodiment of the invention.

FIG. 20 is a diagram illustrating a set of retirement UI functions according to one embodiment of the invention.

FIG. 21 is a diagram illustrating a set of employment and payroll UI functions according to one embodiment of the invention.

FIG. 22 is a diagram illustrating a set of self-service UI functions according to one embodiment of the invention.

DESCRIPTION

Figure 1A:
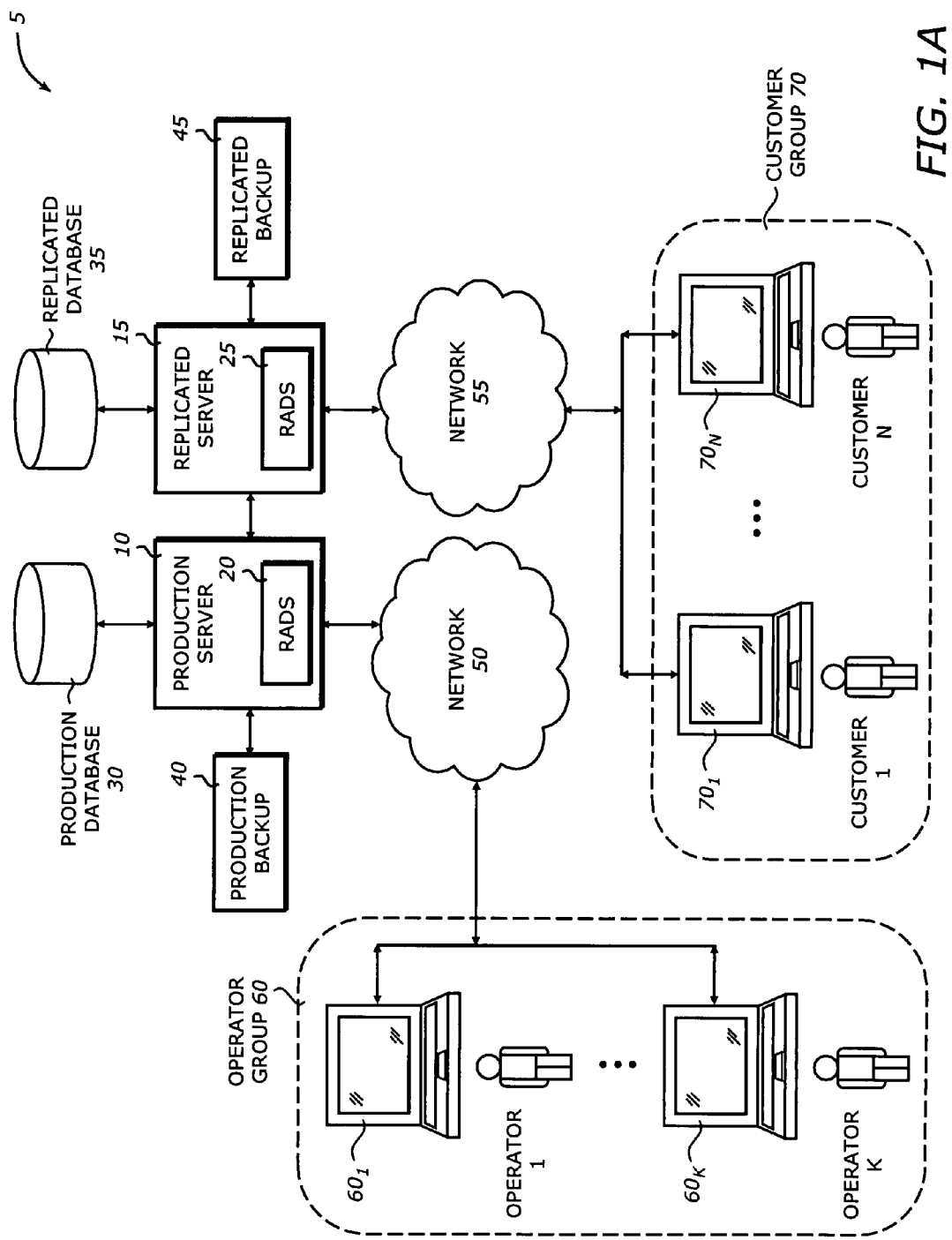
FIG. 1A is a diagram illustrating a system in which one embodiment of the invention may be practiced.

An embodiment of the present invention is a retirement administration and distribution system. A client administering module administers clients using a set of client business rules. The clients include at least an operator and a plurality of customers. An account manager administers accounts and processes retirement benefits of the customers. A communication interface exports and receives communication data related to the accounts and the retirement benefits of the customers.

A business rule processing module is coupled to at least one of a client administering module, a communication interface, an account manager, an employment and payroll interface, and a self-service Website to apply a set of business rules related to accounts and retirement benefits of a plurality of customers to process a transaction.

A user interface (UI) module is coupled to at least one of a client administering module, a communication interface, an account manager, an employment and payroll interface, a self-service Website, and a business rule processing module to interact with an operator through a set of UI functions in a session related to accounts and retirement benefits of a plurality of customers. At least one of the UI functions includes a UI action and a UI display.

An employment and payroll database is coupled to the employment and payroll interface to store employment and payroll information of the customers used by the business rule processing module and/or the UI module.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations may be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a retirement administration and distribution system used by a public agency, such as a pension trust (PT), to administer benefits, retirement, and pension funds for participants. The system integrates disparate applications into a single system that assists the public agency personnel to streamline the business processes, ensures data integrity, and provides the flexibility to respond to changing business requirements.

FIG. 1A is a diagram illustrating a system 10 in which one embodiment of the invention may be practiced. The system 10 includes a production server 10, a replicated server 15, a network 50, a network 55, an operator group 60, and a customer group 70. The system 10 may include more or less than the above components.

The production server 10 is a server that has computing and communication resources to perform tasks related to administration and distribution of retirement benefits. It includes a retirement administration and distribution system (RADS) 20. The RADS 20 is an integrated software package that implements the functionalities of a RADS using a number of software tools and platforms. In one embodiment, the RADS 20 utilizes Microsoft .NET environment including Visual Studio.NET, Active Server Pages (ASP).NET, Structured Query Language (SQL) server, and Web-enabled browser. The production server 10 has access to a production database 30. The production database 30 includes data stored for use with the RADS 20. The production server 10 may have a production back-up 40. The production back-up 40 includes back-up information for the RADS 20 and the production database 30. The production server 10 is intended to serve the operator group 60.

The replicated server 15 is a server with similar computing and communication resources as the production server 10. It includes a RADS 25. The replicated server 15 is intended for use by self-service customers in the customer group 70. The RADS 25 is the same as the RADS 20 although it may not be updated in real-time. The replicated server 15 has access to a replicated database 35. The replicated database 35 is similar to the production database 30 although it may not be updated in real-time. Like the production server 10, the replicated server 15 has a replicated back-up 45 which contains back-up data for the RADS 25 and the replicated database 35. The replicated server 15 is intended to serve the customer group 70.

The network 50 connects the production server 10 to the operator group 60. The network 50 may be any network that allows the operator group to access the production server 10. In one embodiment, it is a local area network (LAN). It may be expanded to any other network, including a wide area network (WAN), an intranet, an extranet, a wireless network, or the Internet. The network 55 connects the replicated server 15 to the customer group 70. In one embodiment, the network 55 is the Internet to provide the World Wide Web accessibility to the customer group 70. The network 55 may be expanded to include a wireless connectivity such as Wireless Fidelity (Wi-Fi) to allow the customer group 70 to access the replicated server 15 using a wireless device.

The operator group 60 is a group of operators or clients who access the production server 10 to use the RADS 20. It includes K operators $60_1$ to $60_K$. The operators $60_1$ to $60_K$ may represent platforms, terminals, users, applications, or login sessions that communicate with the production server 10. Typically, the operators $60_1$ to $60_K$ are users or applications that access the RADS 20 and/or the production database 30 associated with the production server 10 via the network 50. The operators are typically the staff of the public agency who owns and/or operates the RADS 20.

The customer group 70 is a group of customers or clients who access the replicated server 15 to use the RADS 25. It includes N customers $70_1$ to $70_N$. The customers $70_1$ to $70_N$ may represent platforms, terminals, users, applications, or login sessions that communicate with the replicated server 10. Typically, the customers $70_1$ to $70_N$ are users or applications that access the RADS 25 and/or the replicated database 35 associated with the server 15 via the network 55. The customers $70_1$ to $70_N$ are typically the participants or subscribers of the retirement or benefits plan administered by the RADS 25. The customers $70_1$ to $70_N$ typically access the RADS 25 via the network 55 to view their accounts, make inquiries, or obtain information about their accounts.

Figure 1B:
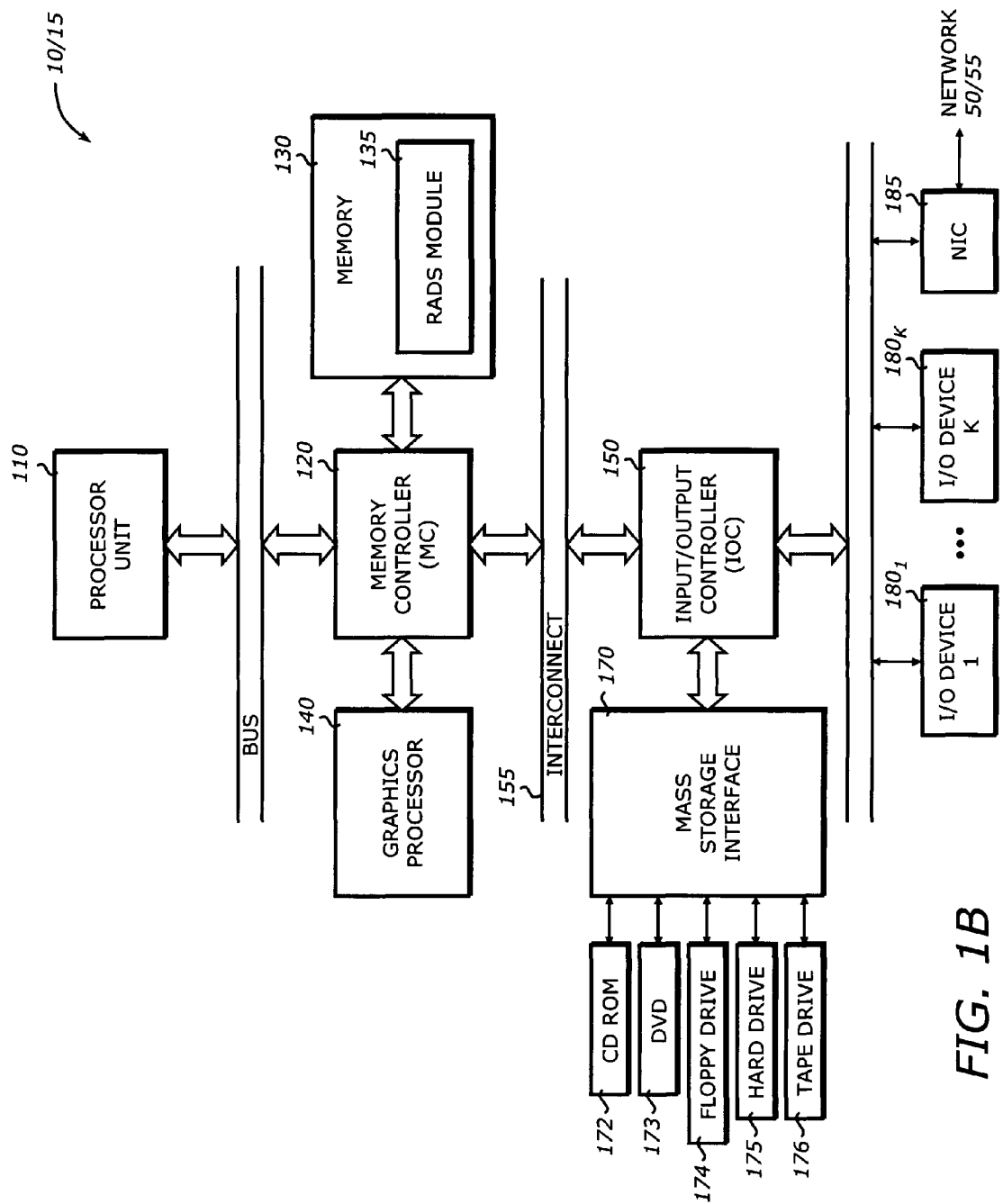
FIG. 1B is a diagram illustrating a server according to one embodiment of the invention.

FIG. 1B is a diagram illustrating the server 10/15 in which one embodiment of the invention may be practiced. The server 10/15 includes a processor unit 110, a memory controller (MC) 120, a main memory 130, a graphics processor 140, an input/output controller (IOC) 150, an interconnect 155, a mass storage interface 170, input/output (I/O devices $180_1$ to $180_K$, and a network interface card (NIC) 185. The server 10/15 may include more or less of the above components.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. In one embodiment, the memory 130 includes a RADS module 135. The RADS module 135 implements the RADS 20 or 25 shown in FIG. 1A. The RADS module 135 may be fully or partly implemented by hardware, firmware, or software, or any combination thereof. In addition, it may be fully or partly located in the memory 130. The main memory 130 also includes an operating system (OS), development tools, platforms, and various application programming interfaces (APIs) to support the development and deployment of the RADS 20/25. These software components may include Microsoft Windows Server 2003 Standard edition (or later), XP Professional Edition (or later), .NET framework 2.0 or later, ASP.NET 2.0 (or later) Application, Microsoft SQL 2005 (or later), MS Office, a Web browser (e.g., Netscape, Internet Explorer v. 6 or later).

The graphics processor 140 is any processor that provides graphics functionalities. The graphics processor 140 may also be integrated into the MC 120 to form a Graphics and Memory Controller (GMC). The graphics processor 140 may be a graphics card such as the Graphics Performance Accelerator (AGP) card, interfaced to the MC 120 via a graphics port such as the Accelerated Graphics Port (AGP) or a peripheral component interconnect (PCI) Express interconnect. The graphics processor 140 provides interface to an external display device such as standard progressive scan monitor, television (TV)-out device, and Transition Minimized Differential Signaling (TMDS) controller.

The IOC 150 has a number of functionalities that are designed to support I/O functions. The IOC 150 may also be integrated into a chipset together or separate from the MC 120 to perform I/O functions. The IOC 150 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 155 provides interface to peripheral devices. The interconnect 145 may be point-to-point or connected to multiple devices. For clarity, not all interconnects are shown. It is contemplated that the interconnect 155 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 170 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 172, digital versatile disc (DVD) 173, floppy drive 174, and hard drive 175, tape drive 176, and any other magnetic or optic storage devices. The mass storage device provides a mechanism to read machine-accessible media. The mass storage device may also contain the databases or libraries accessible to the users or applications $60_1$ to $60_K$ or $70_1$ to $70_N$ shown in FIG. 1A.

The I/O devices $180_1$ to $180_K$ may include any I/O devices to perform I/0 functions. Examples of I/O devices $180_1$ to $180_K$ include controller for input devices (e.g., keyboard, mouse, trackball, pointing device), media card (e.g., audio, video, graphic), network card, and any other peripheral controllers.

The NIC 185 provides network connectivity to the server 10/15. The NIC 185 may generate interrupts as part of the processing of communication transactions. In one embodiment, the NIC 185 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 185 in the processing system. Typically, the NIC 185 supports standard Ethernet minimum and maximum frame sizes (64 to 1518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may be support copper Gigabit Ethernet defined by IEEE 802.3ab or fiber-optic Gigabit Ethernet defined by IEEE 802.3z.

The NIC 185 may also be a host bus adapter (HBA) such as a Small System Small Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level mucltiplexing and out of order frame reassembly, on-board context cache for fabric support, and end-to-end data protection with hardware parity and cyclic redundancy code (CRC) support.

Figure 2:
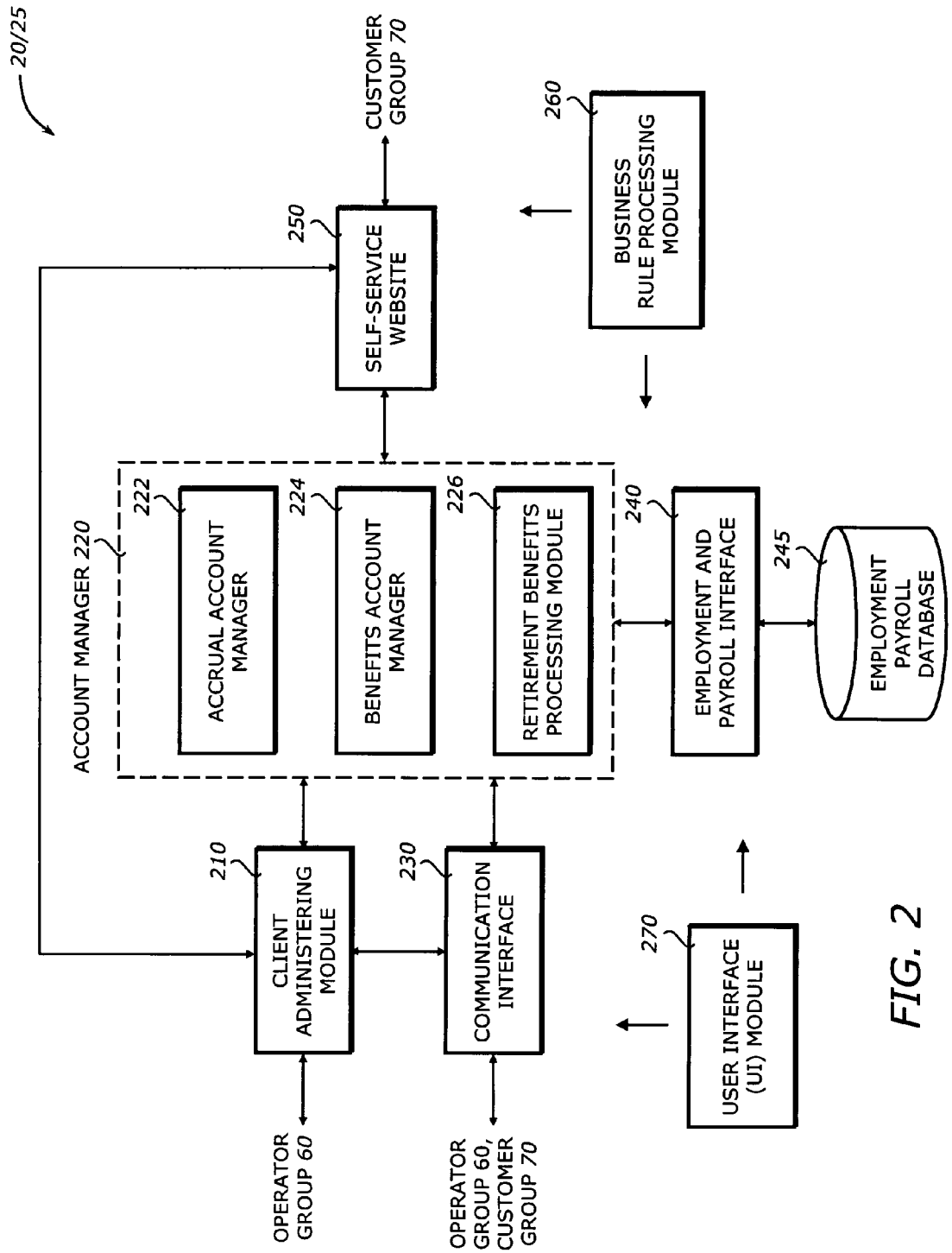
FIG. 2 is a diagram illustrating a retirement administration and distribution system according to one embodiment of the invention.

FIG. 2 is a diagram illustrating the retirement administration and distribution system (RADS) 20/25 shown in FIG. 1A according to one embodiment of the invention. The RADS 20/25 includes a client administering module 210, an account manager 220, a communication interface 230, an employment and payroll interface 240, a self-service wed site 250, a business rule processing module 260, and a user interface (UI) module 270. The RADS 20/25 may contain more or less than the above components.

The client administering module 210 administers clients using a set of client business rules. The clients may include at least an operator 60, (I=1, ..., K) in the operator group 60 and a plurality of customers $70_i$'s in the customer group 70.

The account manager 220 administers accounts and process retirement benefits of the customers. It may include an accrual account manager 222, a benefit accounts manager 224, and a retirement benefits processing module 226. The accrual accounts manager 222 administers accrual accounts of the customers $70_i$'s in the customer group 70 using a set of accrual business rules. The benefit accounts manager 224 administers benefit accounts of the customers $70_i$'s using a set of benefits business rules. The retirement benefits processing module 226 calculates and converts retirement benefits of the customers $70_i$'s using a set of retirement business rules.

The communication interface 230 is coupled to the client administering module and the account manager to export and receive communication data related to the accounts and the retirement benefits of the customers $70_i$'s in the customer group 70.

The employment and payroll interface 240 imports employment and payroll information of the customers from an employment and payroll database 245. The employment and payroll interface 240 may performs functions related to employment and payroll by interacting via the employment and business rules associated with the business rule processing module 260. It may also provide data to be processed, used, incorporated, or acted upon by the business rule processing module 260 and/or the UI module 270.

The self-service web site 250 allows the customers $70_i$'s to view information regarding their accounts and the retirement benefits. The customer may also open and print forms, send inquires, download forms, and perform other tasks related to his or her account.

The business rule processing module 260 is interfaced to at least one of the client administering module 210, the communication interface 230, the account manager 220, the employment and payroll interface 240, the self-service Website 250, and the UI module 270 to process a set of business rules related to accounts and retirement benefits of the plurality of customers. The business rule processing module 260 may be located in each of these modules.

The UI module 270 is interfaced to at least one of the client administering module 210, the communication interface 230, the account manager 220, the employment and payroll interface 240, and the self-service Website 250 to interact with an operator through a set of UI functions in a session related to accounts and retirement benefits of a plurality of customers. The UI module 270 may be located in each of these modules. It may also be interfaced with the business rule processing module 260 in each of the above modules. At least one of the UI functions including a UI action, a UI display, or both.

Figure 3:
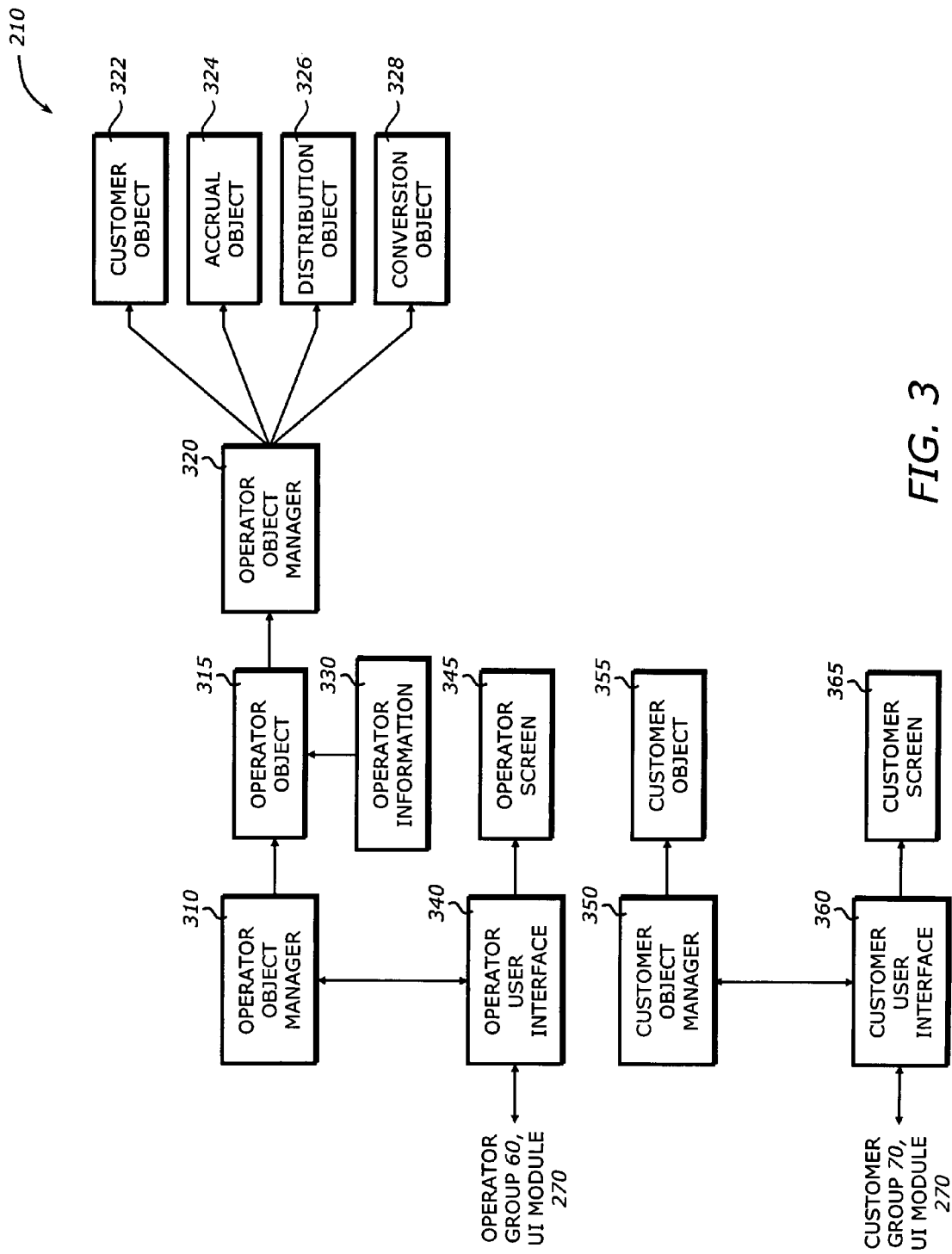
FIG. 3 is a diagram illustrating a client administering module according to one embodiment of the invention.

FIG. 3 is a diagram illustrating the client administering module 210 shown in FIG. 2 according to one embodiment of the invention. The client administering module 210 performs a number of tasks related to setting up and administering clients. The clients include at least an operator and a number of customers. The customers are the participants in the retirement, benefits, or pension plan. The tasks of the client administering module 210 may include: administration of users, roles, and security; creation and maintenance of client profiles and demographics, including multiple contact entries; creation of notes; creation of relationship definition and links; and providing system notifications. The client administering module 210 includes an operator object manager 310, an operator user interface 340, a customer object manager 350, and a customer user interface 360.

The operator object manager 310 instantiate an operator object 315. The operator object 315 validates an operator $60_i$ in the operator group 60, maintains operator information 330, and spawns an operator session object which contains an operator business object 320 using the operator information 330. The operator information 330 includes information related to the operator such as identification code, name, e-mail, phone number, role, role usage, notification, etc. The operator business object 320 includes at least one of a customer object 322, an accrual object 324, a distribution object 326, and a conversion object 328.

The operator user interface 340 is coupled to the operator object manager to show an operator screen 345 related to the operator object 315. The operator user interface 340 is also interfaced to the UI module 270 or incorporated the UI module 270 to carry out UI functions. The operator screen 345 shows one of an operator notifications page, an operator recovery page, an operator switchboard redirection page, and an administrator operator page. The operator notifications page shows all the notifications including those that have been deleted. The operator may open up a customer page by clicking on the notification regarding the customer. The operator recovery page allows the operator to return to what he or she has worked on and select a customer to open. The operator switchboard redirection page redirects the operator to a new page based on the Uniform Resource Locator (URL) settings. The URL settings may include a type parameter and one or more identifier (ID) parameter. For example, the type parameter may be an accrual account, a first ID parameter may the unique ID of the customer record, a second ID parameter may be the unique ID of the accrual account record to be opened. The administration operator page is used by the system administrator to manage the operators. This page allows the system administrator to set up new operators, update existing operators, suspend or stop operators, set up operator roles, extend roles, and assign notification subscription roles.

Each operator has an operator role that defines the authority, rights, scope and capability of the operator. An operator role may include a default role, an extension role, or a notification subscription role. The default role may be one of an administrator role, a staff role, a viewer role, a self-service role. The administrator role has the highest authority and allows the operator to do virtually anything he or she wants regarding the operators. The system operator may log in to the administration operator page as discussed above to manage the operators. The staff role allows the operator to view most data and work with customer profile data. The viewer role allows the operator to view read-only information. The self-service role allows the operator to view his or her own profile in a read-only mode. The extension role extends the authority or the capability of an operator. The extension role may be one of an accrual manager role, a benefit counselor role, a buyback manager role, a distribution manager role, a distribution payroll role, and a transaction manager role. The accrual manager role extends update rights to accrual screens. This role also includes the buyback manager and transaction manager roles. The benefit counselor role extends update rights to retirement calculators. The buyback manager role extends update rights to buyback screens. The distribution manager role extends update rights to distribution screens. This role also includes the distribution payroll role. The distribution payroll role extends update rights to distribution payroll screen. The transaction manager role extends update rights to create new transactions. The notification subscription role provides the operator to subscribe to a notification service that automatically sends a notification to the operator when an event occurs. Usually the event that triggers a notification is an update or a change in the related record or information. The notification subscription role may be one of an accrual account notification, an automated clearing house (ACH) notification, a beneficiary notification, a buyback notification, a customer change notification, a customer major-event notification, a data import notification, an operator change notification, a pending member notification, a reciprocal notification, and a system notification.

The customer object manager 350 instantiate a customer object 355 representing one of the plurality of the customers 70$_i$'s in the customer group 70. The customer object 355 has a customer record object, a customer search object, and a customer relationship object. The customer record object specifies one of customer address, customer address state, customer address type, customer alert, customer contact type, customer directory type, customer dissolution type, and customer gender type. The customer address type indicates address that communication may be sent to. It may be one of a billing address, a default address, a direct rollover custodian address, a garnishment allocation address, a mailing address, a payment address, a residence address, and a support allocation address. The customer alert indicates an alert regarding a condition of the customer that may require a special handling procedure. The customer alert may be a default alert (i.e., no alert), a hearing impaired alert, a mobility impaired alert, a pending divorce alert, a follow-up alert, and a sight impaired alert. The customer contact type indicates the type of contact that was made with the customer. The customer contact type may be one of e-mail, fax, front desk, mail, meeting, note, and phone. The customer directory type indicates that contact information such as home e-mail, home fax, home phone, mobile phone, work e-mail, work fax, and work phone. The customer dissolution type indicates the dissolution of the relationship. It may be one of an annulled marriage dissolution, a court order dissolution, and a divorce dissolution. The customer gender type indicates gender of the customer. It may be one of a not-applicable (e.g., entities and living trusts do not have a gender), female, male, or unknown type. The customer relationship object specifies one of customer relationship sequence, and customer relationship type. The customer relationship sequence indicates the relationship between the customers. It may be one of a beneficiary, estate, other (e.g., other or unknown), spouse, domestic partner, and survivor. The customer relationship type may be one of an alternate payee, child, dependent child (e.g., handicapped child), domestic partner, entity (e.g., non-person entity), estate, ex-domestic partner, ex-spouse, friend, living trust, parent, dependent parent (e.g., handicapped parent), sibling, and spouse.

The customer user interface 360 shows a customer screen 365 related to the customer object 355. The customer user interface 340 is also interfaced to the UI module 270 or incorporated the UI module 270 to carry out UI functions. The customer screen 365 shows one of customer address history, customer main page, customer main accounts, customer main benefactors, customer main beneficiaries, customer main check history, customer main check replace, customer main edit, customer main notes, customer merge, customer profile, customer relationship, popup events, and popup notes. The customer address history page shows all addresses, past and current, of the customer. The address information includes the number, street, city, state, zip code, address type (e.g., billing, mailing), current status, and begin and end dates. The addresses are read-only and may not be edited or deleted. There is a link to a map facility such as Google map or Yahoo map to show the location of the address. The customer main page includes enough information to identify the customer as the person the operator wants to work with. The information is read-only. The customer information displayed on this page may include name, social security number (SSN), birth date, death date, plan entry date, alert, directory information, address information, employee number, and urgent notes. The customer main accounts page shows a summary of the accruals and distributions. The page is read-only but may have some action items such as termination refund or alternate payee split. The customer main benefactors page lists all the benefactors on file for the customer. The page is read-only. To edit the relationships, it is necessary to go to the benefactors profile and then to the beneficiaries page. The customer main beneficiaries page allows the operator to work with the beneficiaries for a customer. The relationship and the dissolution details may be viewed and edited. The customer main check history page shows a list of all distribution checks and statements that have been created for the customer. The check or the statement may be viewed as an image. The customer main check replace page allows the operator to annotate or comment when a check is replaced. The customer main edit page allows the operator to edit the customer's directory listing, addresses, and SSNs. The customer main notes page shows all notes on the customer's file such as the date when the form 1099R was generated. The customer merge page allows the operator to merge multiple customer records into a single customer. The customer profile page allows the operator to edit details about a customer such as customer type, alert, and name. The customer relationship page allows the operator to edit relationship dissolution details. The popup events page allows the operator to create notifications. The popup notes page allows the operator to create notes for a customer.

Figure 4:
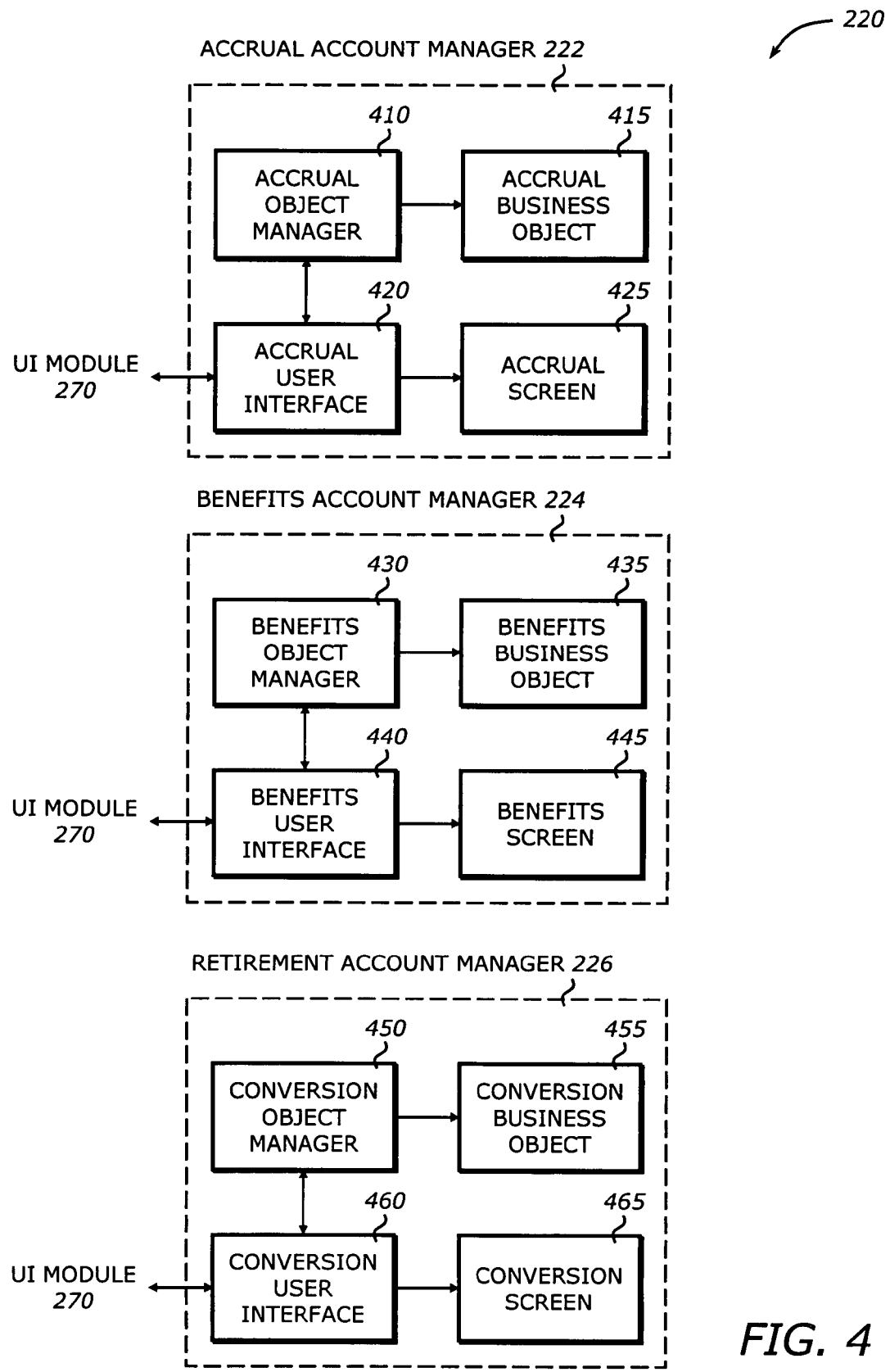
FIG. 4 is a diagram illustrating an account manager according to one embodiment of the invention.

FIG. 4 is a diagram illustrating the account manager 220 shown in FIG. 2 according to one embodiment of the invention. The account manager 220 includes the accrual account manager 222, the benefits account manager 224, and the retirement benefit processing module 226.

The accrual account manager 222 performs a number of tasks such as administration of contribution accounts, tracking of all contribution account related transactions, administration and tracking of buyback and re-deposit obligations, administration of reference tables, and automation of employer payroll and/or employment data feeds. The accrual account manager 222 performs these functions by interacting via the accrual business rules associated with the business rule processing module 260. The accrual account manager 222 includes an accrual object manager 410 and an accrual user interface 420.

The accrual object manager 410 instantiates an accrual business object 415. The accrual business object may be one of an account manager object, an accrual account tracking object, an accrual buyback base object, an accrual buyback conversion object, an accrual buyback correction object, an accrual buyback leave-without-pay (LWOP) object, an accrual buyback redeposit object, an accrual employer object, an accrual employment object, an accrual employment event object, an accrual pay period object, an accrual rate calculator object, an accrual reciprocal object, an accrual reciprocal entity object, an accrual split account object, an accrual transaction object, an accrual transaction amount object, and an accrual transaction interest object.

The account manager object is responsible for loading summary information for accrual and distribution accounts. It basically contains a collection of data. The accrual account tracking object is responsible for tracking all financial and service-credit postings. This object has a start and stop dates. It also has the ability to set up another account that future to this account may be forwarded to. The account may have an account type where the values are listed in the lookup section. Each time an employee is hired, a new employment account with a child accrual account is set up and used until they are terminated. If they change employer groups during employment, an additional accrual account is created. The accrual buyback base object is responsible for creating and monitoring buyback and re-deposits contracts. When a new buyback is created, the system creates a collection of buyback payments with amortized schedule for the contract. Each future payment is associated with a pay period. As each payment passes, the scheduled amount becomes due and waits for a transaction from the employer to post the buyback amount into the transaction object. This may be a posting from the non-automated payroll process. The accrual buyback conversion object extends on the accrual buyback base object to handle conversion buybacks. The accrual buyback correction object extends on the accrual buyback base object to handle correction buybacks. The accrual buyback leave-without-pay (LWOP) object extends on the accrual buyback base object to handle LWOP buybacks. The accrual buyback redeposit object extends on the accrual buyback base object to handle redeposit buybacks. The accrual employer object is used to add and maintain employer information. The accrual employment object is responsible for the addition of new employments, pending or not, and support the loading of summary accrual account listings. The accrual employment event object is used to add new and view existing employment events. The accrual pay period object is used to create a pay period schedule for each employer because each employer may have its own payroll. The accrual rate calculator object is used to calculate a contribution rate based on age and entry date. The accrual reciprocal object is used to add and maintain reciprocal account details for a customer. The accrual reciprocal entity object is used for standard editing of reciprocal entities. The accrual split account object is used to split an account by date. It separates a single account into two accounts based on the split date. All transactions are moved into the appropriate new accrual account. The accrual transaction object is used to process an accrual transaction. A transaction is performed every time a dollar amount or a service-credit amount is added or taken away. A transaction may have multiple parts. A collection of transaction amounts is linked to the transaction where each dollar and PTSC is placed in a traceable and auditable bucket. The accrual transaction amount object represents the transaction amount, or bucket. Each bucket has a type which details pre- or post-tax buckets. Each transaction may also be linked to an employer pay period for reporting and for ad-hoc audits from the public agency staff. The transaction amount object represents where the dollars and PTSC is saved and retrieved. The accrual transaction interest object is used to calculate interest on accrual account balances.

The accrual user interface 420 shows an accrual screen 425 related to the accrual business object 415. It may interface to the UI module 270 or incorporate the UI module 270 to carry out UI functions. It may show one of an accrual account page, an accrual account alternate payee split, an accrual account buyback main page, an accrual account main page, am accrual account merge page, an accrual account pending page, an accrual account pending main page, an accrual account reciprocal main page, an accrual account split page, an accrual buyback conversion page, an accrual buyback correction page, an accrual buyback LWOP page, an accrual buyback redeposit page, an accrual employment page, an accrual employment event page, an accrual employment merge page, an accrual employment split page, an accrual interest post page, an accrual reciprocal page, an accrual transaction add page, an accrual transaction history page, a popup accrual buyback schedule page, and a popup accrual rate calculator page.

The accrual account page allows the operator to update accrual account details in an employment. It may show the start date, the stop date, the employer group, the rate, the salary, the normal hours per pay period, the interest type. The accrual account alternate payee split page is used to perform an alternate payee accrual account split. The accrual account buyback main page lists all the buybacks on file for a customer including active, inactive, and estimates. It may show a buyback type, a contract date, a start date, a stop date, payment amount, the total number of payments, the total number of received payments, and the remaining number of payments. The accrual account main page lists all the employments and accrual accounts on file. It may show an employer group, an account type, employee number, hire date, termination date, plan entry date, and entry age. The accrual account merge page is used to merge multiple accrual accounts into a single accrual account. The accrual account pending page is used to edit pending information on an employment. The accrual account pending main page lists all the pending employments and accrual accounts on file. The accrual account reciprocal main page lists all reciprocal accounts on file including active, inactive, and invalid. The accrual account split page is used to perform a date split on an accrual account. The accrual buyback conversion page is used to set up or view a conversion buyback. The accrual buyback correction page allows the operator to set up or view a correction buyback. The accrual buyback LWOP page allows an operator to set up or view a LWOP buyback. The accrual buyback redeposit page allows an operator to set up or view a redeposit buyback. For all the buyback pages, based on the information provided by the user, the corresponding buyback page may display buyback information such as down payment, amortized schedule of payments, and approximate ending date and number of payments. The accrual employment page is used to add or modify employment details. The accrual employment event page is used to add employment events. The accrual employment merge page is used to merge multiple employment accounts into a single employment. The accrual employment split page is used to split an employment account. The accrual interest post page is used to select an employer and run the interest calculations. The accrual reciprocal page is used to add, modify, and inactivate reciprocal accounts. The accrual transaction add page allows the operator to add new accrual transactions and transaction amounts. This page lists all transactions that have already been created. The operator may set up the amounts and the type to be posted. The amounts and service credits may be a positive or negative value. The accrual transaction history page is used to search transactions in the system. The popup accrual buyback schedule page shows extended information about a buyback plan including a full amortized schedule, a number of payments estimate listing, and a detail of principal interest buildup details. The popup accrual rate calculator page is used to calculate the contribution rates.

The benefits account manager 224 performs a number of tasks such as administration of retirement accounts; management of deductions; tracking of all benefit account related transactions; processing and reconciliation of the benefit payroll; printing checks; generating, printing and filing form 1099R; and exporting payments via third party web-enabled ACH processing. The benefits account manager 224 performs these functions by interacting via the benefits business rules associated with the business rule processing module 260. The benefits account manager 224 includes a benefits object manager 430 and a benefits user interface 440.

The benefits object manager 430 instantiates a benefits business object 435. The benefits business object is one of a benefit account object, a benefit automated clearing house (ACH) account object, a benefit ACH bank object, a benefit account allocation object, a benefit Cost-Of-Living Adjustment (COLA) object, a benefit account contribution object, a benefit check object, and a benefit account deduction object.

The benefits user interface 440 shows a benefit screen 445 related to the benefits business object 435. It may interface to the UI module 270 or incorporate the UI module 270 to carry out UI functions.

The retirement benefit processing module 226 performs a number of tasks such as setting up and maintaining a matrix of actuarial information used in retirement calculations; generation and saving of multiple retirement benefit estimations; conversion of estimates to a retirement allowance; and generation of retirement benefits based on historical accrual account transactions. The retirement benefit processing module 226 performs these functions by interacting via the retirements business rules associated with the business rule processing module 260. The retirement benefit processing module 226 includes a conversion object manager 450 and a conversion user interface 460.

The conversion object manager 450 instantiates a conversion business object 455. The conversion business object 455 may be one of a conversion annuity factor object, a conversion blended retirement collection object, a conversion formula group object, a conversion formula group usage object, a conversion high salary collection object, a conversion retirement object, a conversion termination refund object.

The conversion user interface 460 shows a conversion screen 465 related to the conversion business object 455. It may interface to the UI module 270 or incorporate the UI module 270 to carry out UI functions. The conversion screen 465 shows one of a conversion estimate main page, a conversion retirement estimator page, a conversion retirement first option page, a conversion retirement second option page, a conversion retirement third option page, a conversion retirement reserve page, a conversion retirement unmodified page, a conversion termination refund batch page, a conversion termination refund elements page, and a conversion termination refund prerequisites page.

Figure 5:
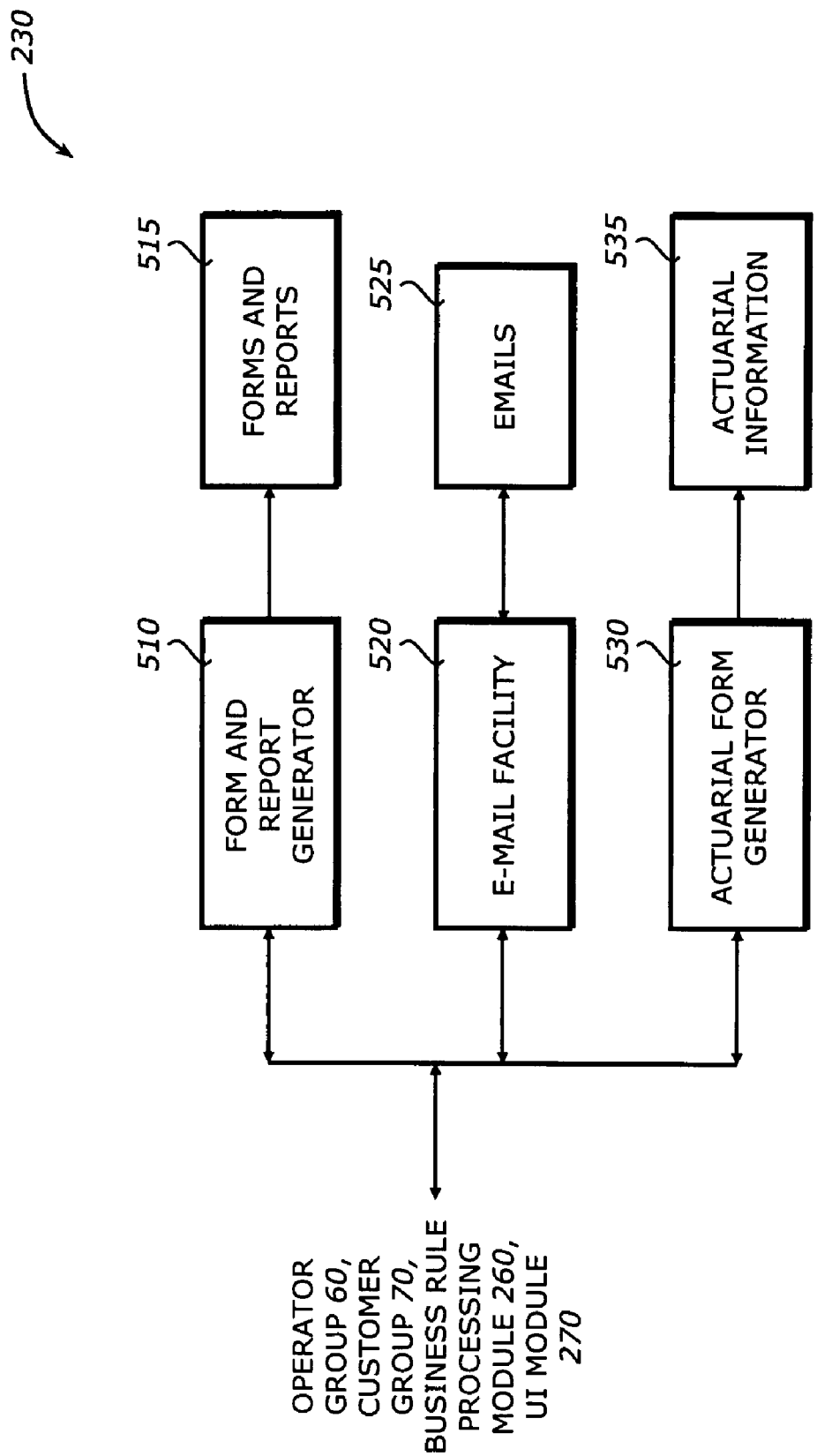
FIG. 5 is a diagram illustrating a communication interface according to one embodiment of the invention.

FIG. 5 is a diagram illustrating the communication interface 230 shown in FIG. 2 according to one embodiment of the invention. The communication interface 230 performs a number of functions such as report generation, various communication functions, and information exporting. The communication interface 230 performs these functions interacting via the communication business rules associated with the business rule processing module 260. The communication interface 230 includes a form and report generator 510, an e-mail facility 520, and an actuarial form generator 530.

Figure 6:
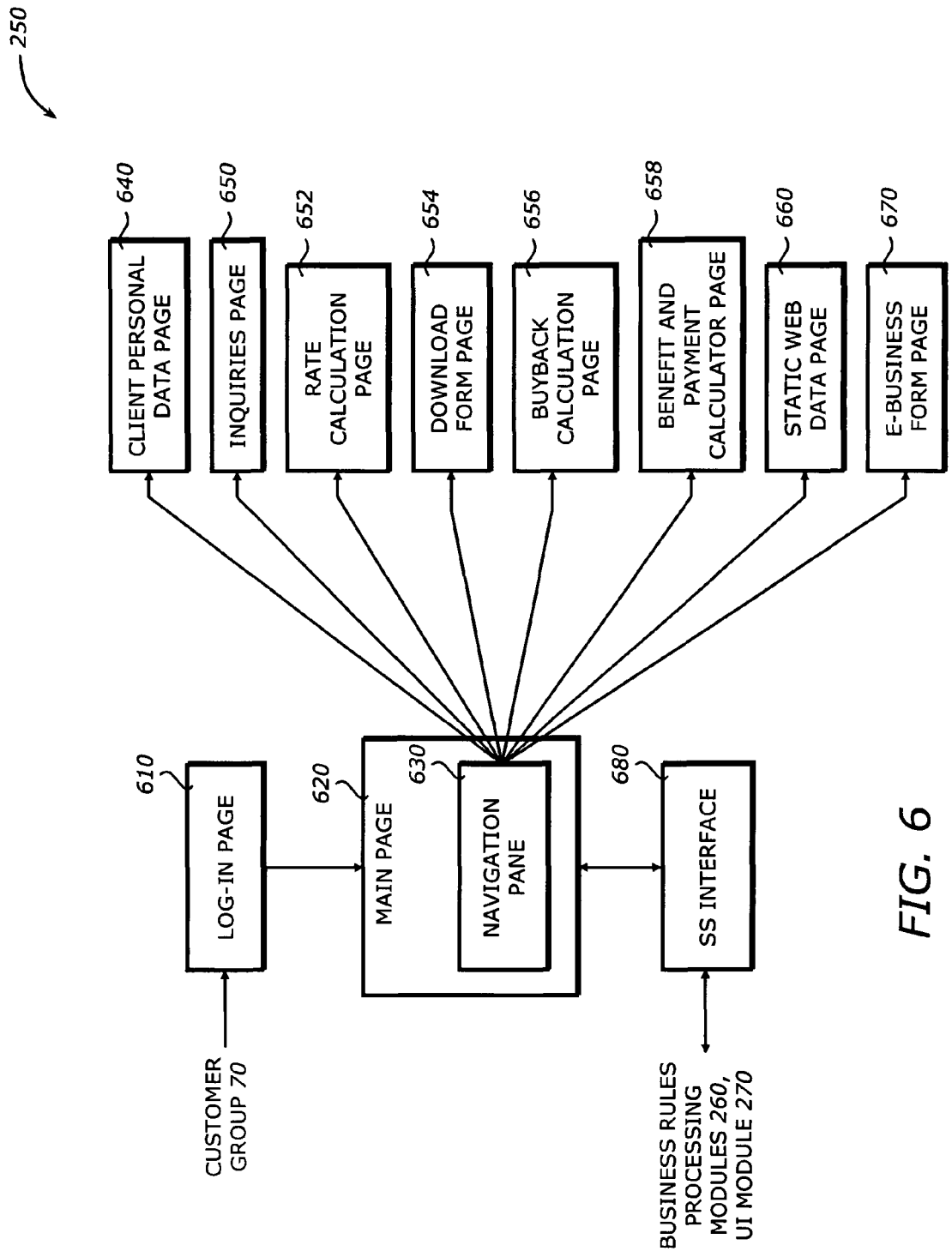
FIG. 6 is a diagram illustrating a self-service web site according to one embodiment of the invention.

The form and report generator 510 exports data to forms and reports 515. The e-mail facility 520 originates and receives related e-mails 525. The actuarial form generator 530 exports actuarial information. They may interface to the business rule processing module 260 and/or the UI module 270, FIG. 6 is a diagram illustrating the self-service web site 250 shown in FIG. 2 according to one embodiment of the invention. The web site 250 performs a number of tasks such as providing logon and password functionality; providing home and informational web pages containing static data; administration of static web-page content; providing inquiries via e-mail; allowing the customer to view personal data; calculation of contribution rate; calculation of retirement benefits; providing form downloading; providing e-business form (e.g., changes in customer profile, forms submission). The web site 250 performs these functions interacting via the self-service (SS) business rules associated with the business rule processing module 260. The web site 250 includes a log-in page 610, a main page 620, and an SS interface 680.

Figure 7A:
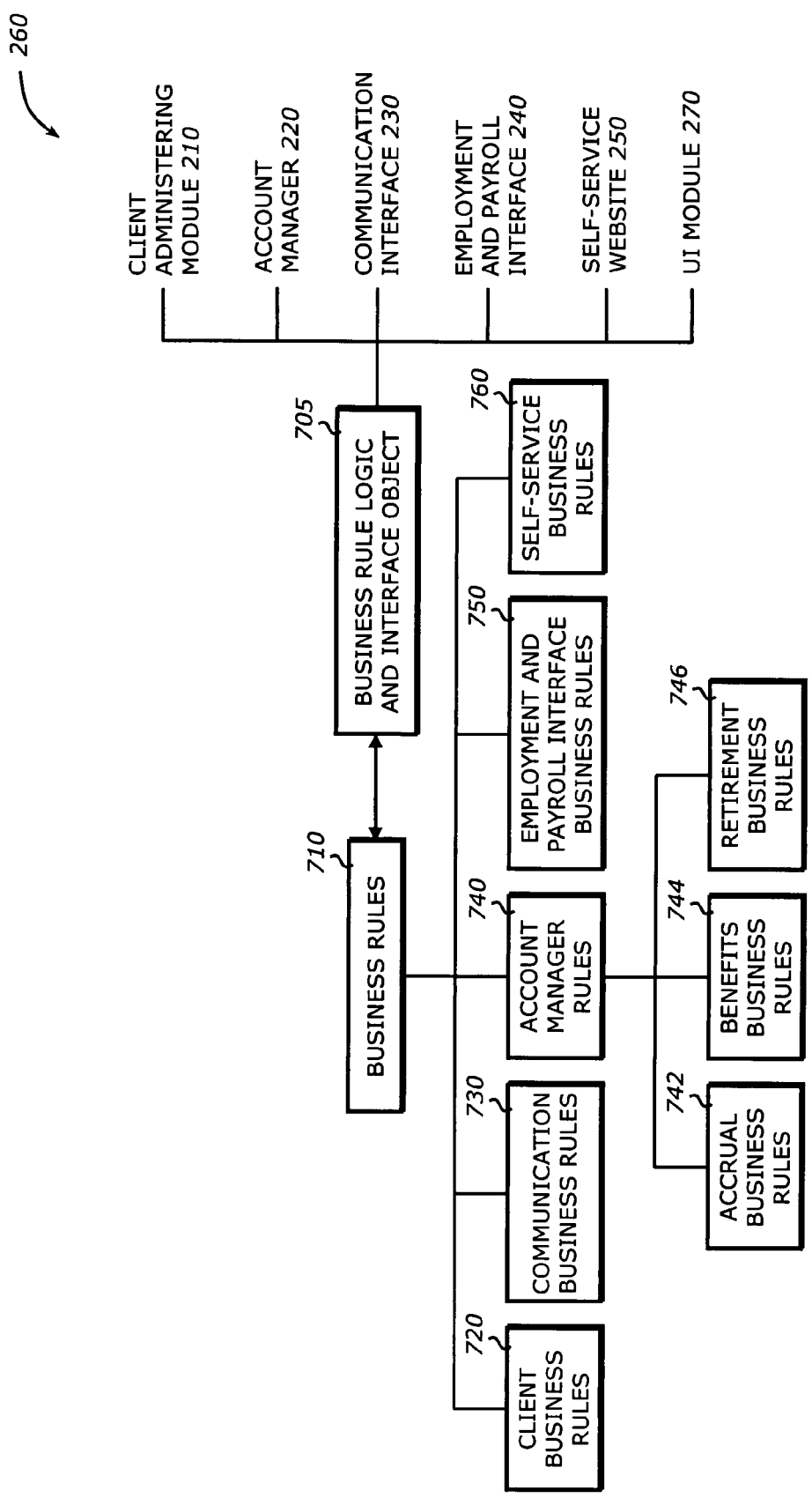
FIG. 7A is a diagram illustrating a business rule processing module according to one embodiment of the invention.

The log-in page 610 validates a customer in the customer group 70. The main page 620 is displayed after the customer is validated. The main page 620 contains a navigation pane 630. The navigation pane 630 provides navigation to one of a client personal data page 640, an inquiries page 650, a rate calculation page 652, a download forms page 654, a buyback calculation page 656, a benefit and payment calculator page 658, a static web data page 660, an e-business form page 670, and a SS interface 680. The SS interface 680 may utilize or integrate into any one of the business rules processing module 260 or the UI module 270 to apply the business rules or the UI requirements or commands FIG. 7A is a diagram illustrating the business rule processing module 260 shown in FIG. 2 according to one embodiment of the invention. The business rule processing module 260 includes a business rule logic and interface object 705 and a set of business rules 710.

The business rule logic and interface object 705 interfaces to at least one of one of the client administering module 210, the communication interface 230, the account manager 220, the employment and payroll interface 240, the self-service Website 250, and the UI module 270 to apply the corresponding rules in the set of business rules 710.

The set of business rules 710 includes at least a set of client business rules 720; a set of communication business rules 730; a set of account manager rules 740; a set of employment and payroll interface business rules 750; and a set of self-service business rules 760. The set of account manager rules 740 includes at least one of a set accrual business rules 742, a set of benefits business rules 744, and a set of retirement business rules 746. Each of these business rules is used in the associated module. For example, the set of client business rules 720 is used with the client administering module 210.

Figure 7B:
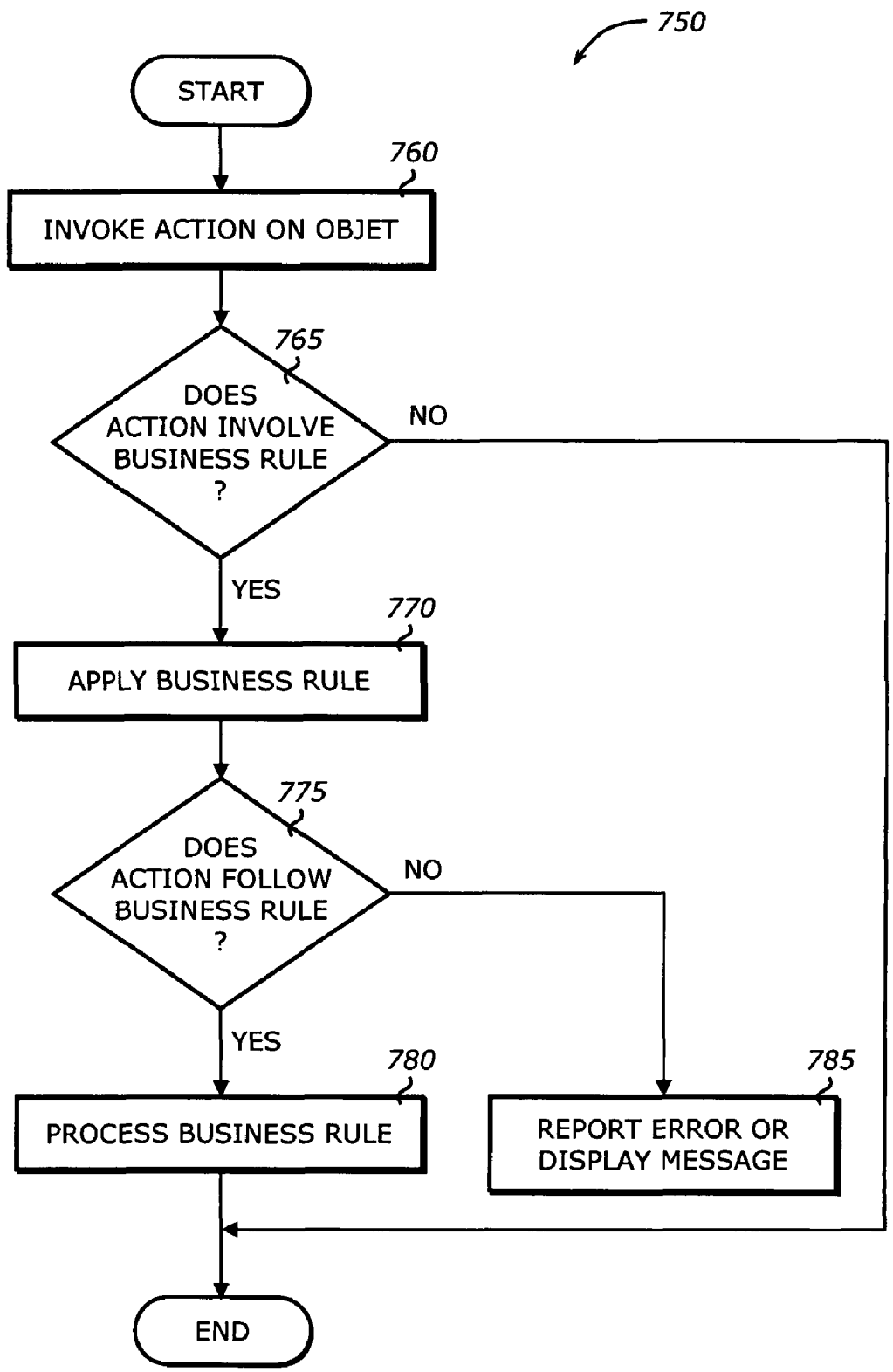
FIG. 7B is a diagram illustrating a process for a business rule logic and interface object according to one embodiment of the invention.

FIG. 7B is a diagram illustrating a process 750 for the business rule logic and interface object 705 shown in FIG. 7A according to one embodiment of the invention.

Upon START, the process 750 invokes an action on an object (Block 760). For example, a user (e.g., PT staff) may open a page to enter address of a client, set up a beneficiary, to compute the death benefit if the deceased member is eligible to retire, etc. Next, the process 750 determines if the action involves a business rule (Block 765). If not, the process 750 is terminated. Otherwise, the process 750 applies the business rule (Block 770). For example, if the user enters the address of a client, the action may involve an address rule (e.g., address rules 810 as shown in FIG. 8). Therefore, the address rule may be applied.

Then, the process 750 determines if the action follows the business rule (Block 775). For example, if the user enters more than one active contact data of each type of contact information, the action may not follow one of the contact information rules 820 which prohibit multiple active contact data. If the action follows the business rule, the process 750 processes or performs the business rule (Block 780) and is then terminated. Otherwise, the process 750 reports an error or displays a warning message (Block 785) and is then terminated.

FIG. 8 is a diagram illustrating the set of client business rules 720 shown in FIG. 7 according to one embodiment of the invention. The set of client business rules 720 includes at least one of address rules 810, contact information rules 820, customer profile rules 830, pending member rules 850, link relationships rules 860, and search function rules 870.

The address rules 810 may include rules to allow a client to have multiple addresses, to assign a type of an address, to allow a client to have only one active or current address of each type, to use a mailing address provided in the employment and payroll database as a default address; and to allow an inactive address to be re-activated.

The contact information rules 820 may include rules to prohibit a client to have multiple active contact data of each type, and to assign a type of contact data. The contact type may be any one of phone number, home fax number, work fax number, home e-mail address, work e-mail address, and cell phone number.

The customer profile rules 830 may include rules to allow a client to have a unique identifier in the system; to create a client from an automated payroll feed; to allow a PT user to create manually a pending member, an alternate payee, or a dependent/beneficiary with appropriate permissions; to calculate the pension trust service credits (PTSC) for an active member when in receipt of scheduled payroll data, based on the employer group (e.g., employer, bargaining unit, member classification, benefit group), member time type (e.g., full-time, half-time, etc.) and contribution rate; to calculate the interest on the beginning balance of the contribution for the members and reserve participants on scheduled payroll dates before the most recently received contributions are applied to the account; to lock down the customer data results from the automated payroll feed except with an executive override role; to allow data from the payroll feeds to overwrite any user-changed data for the data fields received from the payroll; to allow a PT user to add or edit any additional address types (other than the one received in employer payroll feeds) and other non-employer provided information to customers created from automated data feeds; to allow a customer to be identifiable as one of a member, retiree, disability, suspense, reserve, reciprocal-reserve, reciprocal-in, leave without pay (LWOP), dependent, spouse, beneficiary, or survivor, not mutually exclusive; to track the vested status of a customer; to allow duplicate SSNs to be entered; to send notifications on duplicate SSNs; to send notifications when any of the following information is changed: SSN, name, gender, marital status, date of birth, bargaining unit, member classification, contribution rate, payment address, status; to set triggers on birth date to provide notification of major events; and to trigger notifications 30 calendar days in advance of a major event. The PTSC may be computed as ((hours worked less overtime)/normal hours)*[factor] where overtime is any hours exceeding 80 in a two-week pay period for any time type.

The pending member rules 840 may include rules to provide a notification if a pending member is in the system and no matching record is received in subsequent data feeds from the employer; and to provide a notification if a new member record is received in a data feed for which there is no pending member in the system.

The link relationships rules 850 may include rules to allow a pension trust user with rights to see and navigate relationship links that exist between clients in the system.

The search function rules 860 may include rules to search on any of the following fields of data from the advance search page: SSN or Tax ID, name (last name, first name, or entity name), benefit paycheck number, employee ID, birth date, and employer group; to populate more than one field in the above to narrow the search; to take the user directly to a customer record if a single match on search criteria is made; to include pending members in the search results; and to clear all previously entered search criteria.

FIG. 9 is a diagram illustrating the set of communication business rules 730 shown in FIG. 7 according to one embodiment of the invention. The set of communication business rules 730 includes at least one of forms and letters rules 910, look-up and data reference manager rules 920, log-on and password rules 930, customer notes rules 940, operator and system notifications rules 950, pension trust operator rules 960, and operator security rules 970.

The forms and letter rule 910 create the forms and letters with the associated security roles: buyback letters—PT Staff, acceptance of funds letter—PT Staff, reciprocity related letters—PT Staff, termination letters—PT Staff, death related letters—PT Staff, layoff related letters—PT Staff, address confirmation letter—PT Staff, direct payee letters—PT Staff, income statement letter—PT Staff, age 65 letter—PT Staff, benefit reduction letter—PT Staff, direct deposit related letters—PT Staff, workers comp letter—Buyback Manager, active death letters—PT Staff, tax related letters & forms—PT Staff, additional contributions letter—PT Staff, termination refund letters—PT Staff, multi-purpose change form—PT Staff, retirement related letter—Benefits Counselor Estimate, lump sum death benefit forms, and retirement estimate & election forms.

The look-up and data reference manager rules 920 may include rules to allow files uploaded to the system to be complete replacements of former data; to support further future granularity of employer group, such as SAPs benefit groups; to allow a look-up manager role to add or modify look-up tables; and to allow an administrator role to upload data reference files.

The log-on and password rules 930 may include rules to allow only valid users to login and open the application; to set password changes not mandatory; and to set a session timeout time to be a pre-determined time period (e.g., 8 hours)

The customer notes rules 940 may include rules to automatically post a note when the following data is changed: member classification, bargaining unit, SSN, name, payroll address, account transactions, and marital status; to allow a user to initiate a note when in any part of the system; to allow a user to mark/unmark a note for high visibility; to prohibit a user to edit a note; to prohibit a user to delete a note; to purge notes according to pension trust defined parameters; to require a user to attach a note to an existing client record before exiting notes; to limit a note to a pre-determined number of characters (e.g., 2,000 characters); and to provide an option to open/edit/attach a system form letter or a document on the user's desktop.

The operator and system notifications rules 950 may include at least a rule to allow a user to assign a notification to appear on his or her personal list or on that of another system user.

The pension trust operator rules 960 may include at least a rule to allow only PT administrators to setup or edit Operator profiles.

The operator security rules 970 may include at least a rule to allow only PT administrators to setup or edit operator security role profiles.

FIG. 10 is a diagram illustrating the set of accrual business rules 742 shown in FIG. 7 according to one embodiment of the invention. The set of accrual business rules 742 includes at least one of distribution account rules 1010 and accrual accounts interest rules 1030.

The distribution accounts are the heart of the Pension Trust's distribution of retirement and benefit payments. They exist for anyone receiving a recurring or one-time payment from the Pension Trust. This does not apply to payment of administrative expenses which are handled outside this system.

The distribution account rules 1010 may include rules to allow a client to have accrual accounts and distribution accounts at the same time; to allow a client to have multiple distribution accounts; to allow one or more accrual accounts to contribute to the retirement distribution account; to allow a distribution account to be divided manually by an operator between a retiree and an alternate payee; to subject the distribution accounts to COLA increases; to allow an operator to schedule a one-time payment outside of the PT payroll schedule; to default the recurring allowances and benefits to the monthly pension trust payroll schedule; to default the recurring payments to no stop date; to designate primary and contingent beneficiaries for a periodic distribution, with defined exceptions; to prohibit beneficiaries to name a beneficiary for a beneficiary allowance; to prohibit a survivor to name a beneficiary for a survivor continuance allowance; to provide a message to the operator after modifying beneficiary information for beneficiaries associated with a retiree receiving option 2 or 3 retirement benefits, reminding the operator to recalculate the allowance; to limit industrial disabilities to members in Safety new collective bargaining agreements; to provide a notification when a customer who receives a 10.06 payment has a change in salary, which allows the operator to recalculate and implement an offset transaction to the 10.06 payment; to use the payment address type, a default address time if there is no payment address type entered the system, as a default address rule for mailing physical check payments; to allow deductions and allocations to be taken from the distribution payment; and to select a distribution account detailed summary if there is only one in the distribution account detailed summary dropdown list, or to select a distribution account detailed summary as selected by the user.

Regarding the manual division rule, such a split results in two separate distribution accounts. The operator makes a notation on the alternate payee account regarding contributing accrual accounts, as there is no link, and manually adjust the retire allowance and set-up the alternate payee allowance.

The pension trust applies interest to accrual account balances (i.e., contributions plus interest in accrual accounts) belonging to members, alternate payees, reserve and reciprocal reserve participants. The pension trust applies interest on a pay period schedule, but not on the most recent pay-roll feed since funds need to be on deposit for a pay period before interest is applied. Interest jobs are, however, dependent on payroll feeds being successfully accepted and contributions posted. They therefore follow a linear schedule. However, the actual date the interest job was run could vary and is controlled by the PT.

The accrual accounts interest rules 1030 may include rules to compute the effective date that the interest shows to be the pay date plus one day; to apply interest calculations to accrual account balances of normal and additional contributions and previously posted interest, including buyback transactions and adjustments that have been posted up to the day before the effective date; to apply interest on qualifying funds in accrual accounts for members, reserve participants, alternate payees and reciprocal reserve participants; to apply interest to all qualifying accounts, whether or not contributions were received for the member in the payroll period for which the interest job is run, such as when the member is on Leave Without Pay (LWOP); to prevent interest from being posted out of order; and to prevent interest from being posted on a subsequent payroll if the previous payroll(s) has not been accepted and interest applied.

Figure 11:
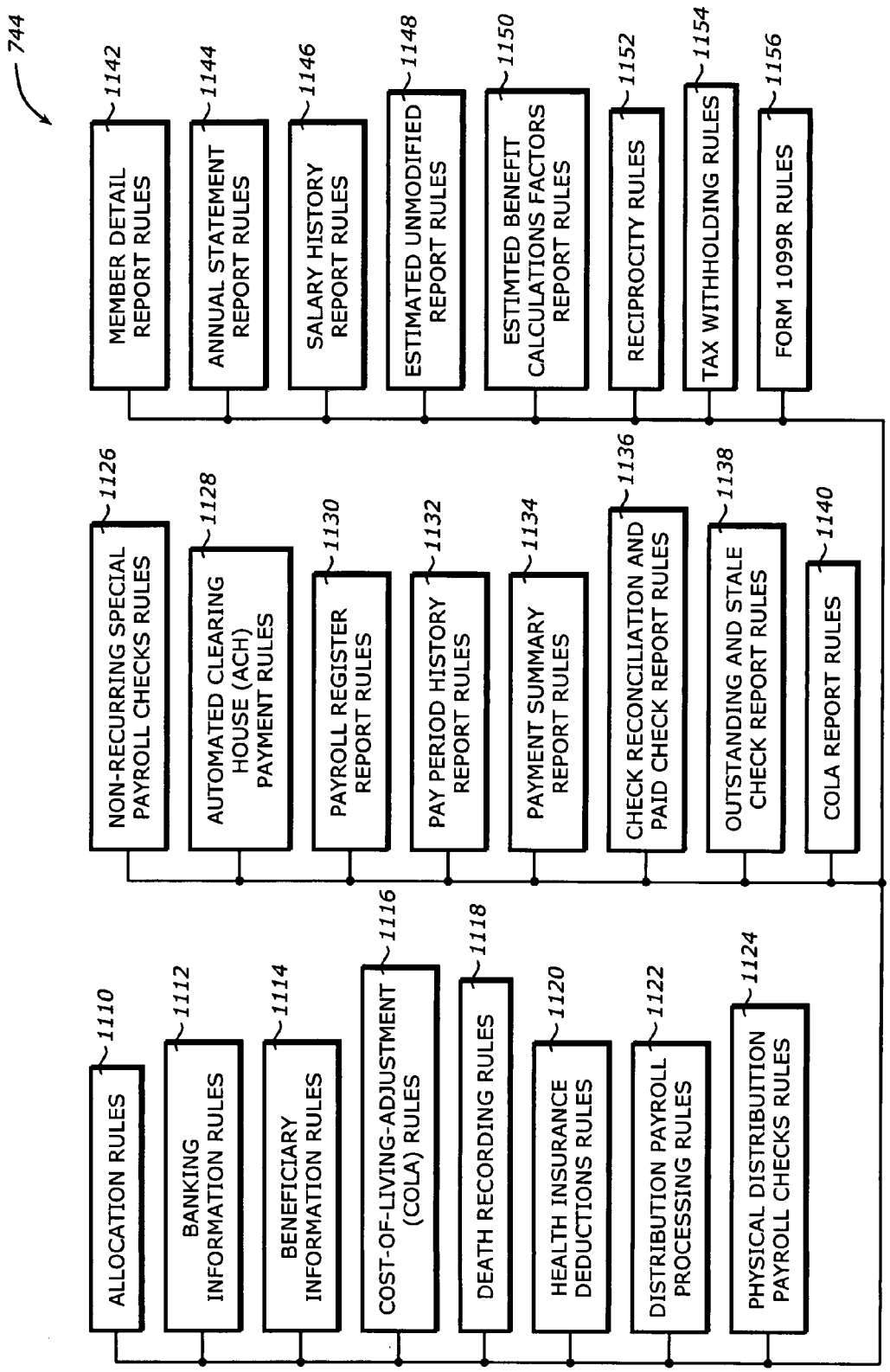
FIG. 11 is a diagram illustrating a set of benefits business rules according to one embodiment of the invention.

FIG. 11 is a diagram illustrating the set of benefits business rules 744 shown in FIG. 7 according to one embodiment of the invention. The set of benefits business rules 744 includes at least one of allocations rules 1110, banking information rules 1112, beneficiary information rules 1114, cost-of-living-adjustment (COLA) rules 1116, death recording rules 1118, health insurance deductions rules 1120, distribution payroll processing rules 1122, physical distribution payroll checks rules 1124, non-recurring special payroll checks rules 1126, automated clearing house (ACH) payments rules 1128, payroll register report rules 1130, pay period history report rules 1132, payment summary report rules 1134, check reconciliation and paid check report rules 1136, outstanding and stale check report rules 1138, COLA report rules 1140, member detail report rules 1142, annual statement report rules 1144, salary history report rules 1146, estimated unmodified report rules 1148, estimated benefit calculations factors report rules 1150, reciprocity rules 1152, tax withholding rules 1154, and form 1099R rules 1156.

The pension trust requires the ability to allocate distribution payments to the destinations indicated by a plan participant or a court order. Payments may be made with a physical check or via electronic fund transfer to the plan participant and/or a payee that they designate. There are two types of allocations—allocations to the participant's own accounts and allocations to third parties. Allocations to a participant's own accounts may be accomplished by ACH or by physical check. Allocations to third parties may be by physical check. For example, a participant may elect to split the deposit of his/her monthly payment between multiple bank accounts (e.g., their own). There may also be a need to allocate part of the same payment to court-ordered child or spousal support, lien or other type of garnishment. The allocations rules 1110 include at least one of a system level allocation rule to prioritize allocations along with deductions at the system level by the administrator; and an account level allocation rule to prioritize allocations at the individual distribution account level by an operator with the proper role assigned along with deductions.

Banking information supports electronic fund transfer of payments to a client. It includes current ACH bank information, and instructions for distribution of funds between client bank accounts. The banking information rules 1112 may include rules to:

allow the user to enter the dollar amount and the percentage defaults to 100 when entering a single ACH route;

allow the user to enter a distribution percentage per route and the system will calculate and display the dollar amounts according to the percentages entered for multiple ACH routes;

allow a user to override the system calculated dollar amounts;

total distribution percentages to 100%;

check the total dollar amounts for a payment distributed between accounts to be equal to the payment amount entered;

drive automatic entry of the bank name associated with a selected ABA number;

distribute payments between and up to a predetermined number (e.g., three) of bank accounts;

assign a type to each bank account;

allow partial percentages to be entered;

default the status to pre-notify if the ABA number is newly entered;

default the status to pre-notify if the ABA number and/or bank account number is changed;

blank out type of account and require an entry if the bank account number changes;

automatically change accounts set to pre-notify to ACH when payroll process is run;

allow status of check to remove payment as an ACH transaction, and flag payments for check processing;

allow the user to change the status at any time.

The beneficiary information allows the PT to associate a beneficiary with the benefactor client record. Beneficiary in the broadest sense used here includes spouse (eligible survivor or not), dependent child (eligible survivor or not), other eligible survivors such as dependent parent, and any named beneficiary whether a person, entity or the client's estate. The operator determines eligibility. The beneficiary information rules 1114 may include rules to set up the beneficiary in the system with a profile, like any other client, that includes SSN, name, address, contact information, spousal information, banking information, etc.;

allow the alternate payees to designate beneficiaries for monthly benefit payments they may be receiving;

allow beneficiary information to be added manually;

trigger a notification when there are changes to beneficiary information;

allow an accrual account or a distribution payroll account or to be manually added for an alternate payee, and allow a distribution payroll account to be generated from the calculations and conversions module for an alternate payee;

allow a distribution payroll account to be manually added for a beneficiary;

allow the share of the beneficiary payment to be expressed in whole or partial percentages;

calculate death benefits for a deceased member's or retiree's beneficiary, when the user records a death benefit, based on one or more of the following: whether the death occurs before or after retirement, for a participant whether or not they eligible to retire, retirement option selected by the retiree, existence of eligible survivors, the death benefit option chosen by the eligible survivor, the existence of a beneficiary and whether or not it is also the eligible survivor, whether the participant is reciprocal reserve or reserve and their date of death, and whether the client is a safety member and if the death is related to violence or physical force.

A cost of living adjustment (COLA) may be applied on a yearly basis to decrease or increase monthly allowances being paid from a benefit distribution account at a percentage determined by the Board of Trustees. COLAs are not applied to 10.06 allowances in lieu of disability. A maximum annual adjustment defined by the plan (e.g., 3%) determines how much of the increase or decrease is applied against the allowance being paid from a benefit distribution account. The cost-of-living-adjustment (COLA) rules 1116 may include rules to:

apply COLAs against monthly retirement allowances under any of the available options, and monthly death benefit allowances (e.g., beneficiary allowances); and determine COLAs by COLA groups which are set-up annually. In one embodiment, the COLA period runs from January 2 through the following January 1.

Pension trust customers may designate beneficiaries to receive death benefits in the event of death. The customers may be members, alternate payees, reserve participants, or reciprocal reserve participants with funds in their accrual accounts, or retired participants who are recipients of service, disability, industrial disability retirement allowances, or beneficiaries or eligible survivors who receive survivor continuances. Typically the PT staff receives notification of a death (or a request to estimate death benefits). The PT staff then determines the participant's account status and roughly calculates the amount that will be received. If recording an actual death the PT will calculate the final payment(s) due from the pension trust, if any, provide official notification to the survivor/beneficiary(s) with a settlement form (for indicating payout option depending on the scenario) and distribute the benefits on receipt of the settlement form. The death recording rules 1118 may include rules to:

include the sum value of accrual accounts for member, reserve, or reciprocal reserve, the sum value of each alternate payee accrual account individually, and the monthly value of each recurring distribution account (e.g., service retirement annuity, temporary annuity, additional contributions, ordinary disability, industrial disability or survivor continuance);

address a checklist of items including a 10.06 supplementary payments to be stopped, display of buyback account to be closed, display of any reciprocal accounts (operator may want to notify reciprocal agencies), and display any survivor continuance or beneficiary allowance distribution accounts that the deceased was receiving;

compute the basic death benefit to be equal to member's accumulated contributions+($\alpha \times$the members monthly salary for each full year of PTSC not to exceed $\beta$ months salary where $\alpha$ and $\beta$ are two predetermined factors (e.g., $\alpha$=1.5 and $\beta$=18);

compute the death benefit to be equal to the basic death benefit if the deceased member is ineligible to retire;

compute the death benefit if the deceased member is eligible to retire;

compute the death benefit if the deceased member is an inactive reserve or suspense participant;

compute the death benefit if the deceased member is a retiree with an unmodified allowance;

compute the death benefit if the deceased member is a retiree with an option one allowance;

compute the death benefit if the deceased member is a retiree with an option two allowance;

compute the death benefit if the deceased member is a retiree with an option three allowance; and compute the death benefit if the deceased is an eligible spouse receiving a survivor allowance.

The computations of the death benefits are as follows:

Deceased Member eligible to retire: If there is no eligible survivor pay the basic death benefit to the beneficiary(s) or estate; not payable before retirement if there is an eligible surviving spouse the spouse may elect to receive the basic death benefit OR may elect to receive the option two allowance (100% continuance) calculated as though the member retired on the date of death OR may elect to receive 50% of the unmodified allowance calculated as though the member retired on the date of death.

Deceased inactive Reserve or Suspense participant: Pay the amounts residing in their accounts (inactive member death benefit) unless the death occurs within 4 months (120 days) of the separation from county service. In that case, the basic death benefit is paid.

Deceased Retiree with an Unmodified Allowance: If there is an eligible survivor pay a recurring death benefit to the survivor=50% of the current monthly allowance (including COLAs). Pay the $1000 death benefit to the designated beneficiary or to the estate (Note: if there is no eligible survivor the $1000 death benefit is the only payable death benefit.).

Deceased Retiree with an Option One Allowance: If there is no eligible survivor pay an amount equal to 100% of the remaining accumulated normal contributions to the beneficiary(s) or estate; pay the $1000 death benefit to the designated beneficiary or to the estate; if there is an eligible survivor and the annuity portion of the cumulative retirement allowance payments up to the date of death are <the amount of accumulated normal contributions at retirement, then pay a survivor continuance=(50% of the unmodified allowance+ 50% of COLAs received) and 50% of the remaining accumulated normal contributions.

Deceased Retiree with an Option Two Allowance: If there is no eligible survivor or beneficiary pay the $1000 death benefit to the estate. If there is a named beneficiary for the option 2 benefit, but no eligible survivor, pay the option two retirement allowance. If there is a named beneficiary for the option 2 benefit and an eligible survivor (could be different people): Pay the eligible survivor a recurring death benefit= (50% of the unmodified allowance+50% of COLAs received); pay the beneficiary the option two allowance less the payment awarded to the eligible survivor; pay the beneficiary named for the $1000.00 death benefit the $1000.00 death benefit. If the eligible survivor is also named beneficiary pay the (actuarially reduced) option two allowance (see original calculations). If the survivor is a dependent child attaining 18 years of age the recurring death benefit is subsequently reduced to an amount=option 2 allowance−(50% of the unmodified allowance); pay the beneficiary named for the $1000.00 death benefit the $1000.00 death benefit.

Deceased Retiree with an Option Three Allowance: If there is no eligible survivor or beneficiary pay the $1000 death benefit to the estate. If there is a named beneficiary for the option 3 benefit, but no eligible survivor, pay 50% of the Option. Three retirement allowance; pay the beneficiary named for the $1000.00 death benefit the $1000.00 death benefit. If there is a named beneficiary for the option 3 benefit and an eligible survivor (could be different people); pay the eligible survivor a recurring death benefit=(50% of the unmodified allowance+50% of COLAs received); pay the beneficiary the (option three allowance less the payment awarded to the eligible survivor)/2; pay the beneficiary named for the $1000.00 death benefit the $1000.00 death benefit. If the eligible survivor is also named beneficiary, pay 50% of the unmodified Allowance plus (0.5×(option three total allowance less 50% of the unmodified Allowance)). If the survivor is a dependent child attaining 18 years of age the recurring death benefit is subsequently reduced to an amount=option 3 allowance−(50% of the unmodified allowance)

Deceased Eligible Spouse receiving a Survivor Allowance: If the eligible spouse is/was receiving a benefit due to death before retirement of an active member—then the eligible surviving children receive the survivor continuance until the youngest one turns 18. If, at that time, the total benefits paid are less than the amount of the original basic death benefit (BDB) then the remainder of the BDB is paid to the children or estate in a lump sum. If the total amount paid through the date of the survivor's death is greater than the original BDB— the monthly payments cease. If the eligible spouse was receiving the survivor continuance benefit as a result of death of a retired participant then the payment of survivor benefit ceases on the date of the survivors death.

The pension trust supports the deduction of health insurance premiums for medical dental, and vision care from the monthly disability or retirement payment. Pension trust staff will determine if retired participants and/or beneficiaries are eligible to enroll in the health plans offered through the county. The employer may pay part of the premium paid for health insurance based on the eligibility of the participant AND the bargaining unit in which the retired participant was most recently employed. The health insurance deductions rules 1120 may include rules to:

prioritize deductions against other deductions and allocations, both pre- and post-tax;

determine deductions based on operator selection of the provider, and entry of the plan code; and calculate the amount payable by the participant from the premiums associated with the selected plan code and employer pick-ups associated with the retiree's most recent bargaining unit.

The distribution payroll processing rules 1122 provide rules to perform operations related to distribution payroll processing. These rules may include the following:

General:

The participant receives a distribution per distribution account.

A recurring distribution may consist of multiple payments (a net payment and child support payments to others, for example).

Payments in a recurring distribution may be a mixture of physical checks and ACH payments.

For nonrecurring distributions there will always be a single payment per distribution as multiple allocations are not supported for nonrecurring distributions.

The payment in a non-recurring distribution is always a physical check.

Checks in collection status are IRS reportable.

Replace

A payment may only be replaced if it has been voided after acceptance.

A Replacement check may be subsequently replaced by an operator.

On executing the replace command, the system will create a replacement with all original values and information and prompt the user to add it to a non-recurring batch.

Void

A distribution may be voided after print and before accept.

Voided check numbers are not reused.

If voiding an allocation in a recurring distribution with multiple allocations after print and before accept, all allocations in the distribution will be marked void.

A payment may be voided after Accept only on payments that have an unpaid status. The operator may only take this action at the payment, not the distribution, level.

Paid payments may not be voided. They may only be marked unpaid or collection by an operator.

A payment marked unpaid may be voided.

A voided payment may reflect in year-to-date totals on the customer advice statement if it was voided in the same year it was accepted.

Voided payments (including payment that were previously marked paid, then unpaid or collection and subsequently voided) are removed from totals reported to the IRS for the tax year payment was originally issued.

Recurring Payroll:

The system creates recurring payroll distributions, upon executing the Generate command, based on the information within each distribution account.

Recurring payrolls are available to be generated when an operator chooses any time before the distribution payroll date.

A recurring distribution may not be removed directly from a recurring payroll batch. The distribution is stopped at the element level, and the payroll batch may be generated again to take into account the modification.

An entire recurring payroll batch may be voided after print and before accept. The system voids the payments and the operator may re-generate the batch. This is needed should there be a global change (for example, to data at the reference table level), and all payments in the entire batch need re-calculation.

Non-recurring Payroll
 An operator may create a non-recurring payroll batch for future processing.
 A non-recurring batch has an operator created description and pay date.
 A non-recurring distribution may be removed from a non-recurring payroll batch any time before the print command.

Generate
 An operator may execute the generate command on a payroll batch an unlimited number of times before printing.
 Each generate command effectively reverses the previous generate and reinitiates the calculation process. Payments are computed/re-computed on every generate command, taking into account any modifications to payments that may have been made between generate commands.
 If a payroll is re-generated after void, all check numbers from the original generation are voided, and new check numbers created on printing the re-generated payroll.

Exception
 Exception is not an operator initiated action. It is undertaken by the system during the generate process.
 When the batch is generated, if the net pay for a distribution is <$0.00, the entire distribution is shown by the system as an Exception to the payroll.
 Exceptions are not included in the subsequent print process
 Exceptions are displayed in the user's interface.
 Exceptions are flagged at the distribution level, such that a problem with one allocation in the distribution will effectively flag all allocations for the distribution as Exceptions.
 Exceptions will be included in a re-generation of the batch (generate again) whether or not the issue has been addressed. If the reason it was an exception was addressed, the process of generating again will remove the exception status and it will be included in the printing and acceptance of the batch. If the problem was not addressed it will be placed in exception status again.

Exclude
 A payment may be excluded after generate
 Exclusions are flagged at the distribution level.
 A distribution may be un-excluded (and subsequently regenerated) if printing for the batch has not begun.

Print:
 A payment may be printed any time after generate.
 For any payment that has been printed the operator may select re-print before acceptance. Re-print allows the operator to overcome issues, such as printer malfunctions, encountered while printing the checks.
 Check numbers are assigned when the print command is executed.

Accept:
 ACH payments are assumed paid after the payroll is accepted, and should be marked paid by the system.
 After acceptance a copy of the check and advice statement, marked as a copy, may only be printed from the UI image. Re-printing of checks is not allowed after acceptance—if this is needed the operator will Replace the check.

Checks and Statements:
 A statement is issued for all payments, including all ACH and check payments, and payments where the net=$0.00.
 Check numbers are assigned to all allocations.
 Check numbers are assigned to ACH payments.
 The check number appears on the check portion and the advice portion of the check
 The plan participant receives a statement listing all allocations from his/her distribution account.
 A recipient of an allocation from a participant receives a statement with only his/her information.
 A check may not be re-printed post-acceptance. It may be replaced.
 A print copy will be marked non-negotiable.

Compute Dates:
 Computation of an initial and recreated periodic distribution is done per the recurring payroll period date. For recurring payrolls this date is pre-defined in the system as the $1^{st}$ of each month.
 Computation of taxes of an initial and re-created non-periodic, eligible or direct roll-over payment in a non-recurring payroll is done per the operator assigned batch payroll date. Note that deductions do not apply and that elements, allocations and payment channels have been pre-defined by the operator.
 Replacement payments are calculated per the original batch or period that the original payment was part of.

The physical distribution payroll checks rules 1124 include rules to allow an operator with a manager role to void individual checks or statements after printing, to show checks that have a net amount<=$ $0.00 as exceptions, to use the payment address for the address to receive a check, modifications to payments after the check is generated but not after the check has been accepted by the operator, and an operator with the manager role to stop (e.g., ignore) a customer's scheduled payment from being processed and subsequently resume it.

The non-recurring special payroll checks rules 1126 include rules to perform operations related to the non-recurring special payroll checks. These rules may include the following:
 A replacement check is essentially a copy of the original check with a new check number. The statement is not regenerated and remains unchanged. Any associated allocation checks are not re-issued unless initiated by the PT.
 A replacement check is issued with a new check number.
 The system will identify replacement checks and exclude them as transactions to be reported on 1099Rs.
 The system will prevent duplicate replacement checks from being issued for an original payment.
 The system will prevent replacement checks from being issued for reconciled payments marked paid.
 If not voided already, the system will void the original check (whether physical or a failed ACH transaction) when the operator accepts the replacement check.
 An operator with manager rights may remove an individual check/allocation (actually all allocations/checks for the distribution account are removed) from a payroll batch run anytime before acceptance.
 An operator with manager rights may reverse or cancel (post-print) an entire special payroll batch anytime before acceptance.

Printed check numbers may not be re-used, whether or not they were part of an accepted payroll. This will prevent un-sequenced check numbers in subsequent payroll runs.

The system will mark cancelled checks and make them available for reports. This will satisfy audit inquiries on check number sequences.

Individual, a range or all checks and statements in a batch may be re-printed anytime before acceptance. This facilitates recovery from paper, printer or other issues inhibiting check production.

A check or ACH payment may be re-printed with the check portion marked non-negotiable.

The system will prevent the paid ACH payment from being transmitted again to the bank when re-printing an ACH statement.

Payment addresses may be selected from the customer profile when setting up the special check payment channels. This will facilitate sending checks to allocations such as court ordered payments, or for sending direct roll-overs directly to a bank.

Checks will be numbered and printed in ascending sort order by last name, first name, middle name of payee.

Modifications to payments may not be made after the check has been accepted by the operator.

Voided checks are not included in 1099R filing

Voided check numbers will be included in designated reports with no dollar values.

An operator may add a customer payment to a payroll batch so that multiple payments may be processed together.

Special payroll checks are always generated and printed separately from monthly payroll checks.

The automated clearing house (ACH) payments rules 1128 may include rules to:

create an ACH upload file after acceptance of the recurring monthly payroll;

include non-excluded [excluded items are on the exception report and not included in the payroll run] pre-note and ACH type transactions in the ACH upload file.

send, for pre-note type transactions, a zero dollar transaction to the receiver's account to validate the transit routing number and account number and includes that transaction as a check payment in payroll processing.

automatically change the type from pre-note to ACH after acceptance of the payroll.

assign check numbers to ACH payments.

include the check number in one of the optional ACH entry detail record fields or in an Addenda Record to assist tracking of check numbers.

The payroll register report rules 1130 may include rules to:

generate the payroll register report only after a distribution payroll run has been accepted. acceptance occurs after payroll is run.

include check information for both participants and their allocations.

prohibit data on the report to be directly manipulated by an operator, in order to satisfy auditing requirements.

include in the report voided checks that have an associated check number.

show the word VOID for voided checks included in the report where any value would normally be shown for a check.

indicate which checks are replacement checks along with the replacement void check. Values for voided replaced checks should be shown as negative values.

allow all information on the report for an individual check record to appear on the same line and on the same page. Wrapping of the line is allowed The pay period history report rules 1132 may include rules to:

calculate all report elements (e.g., sub-totals, most recent account status) as of the "To Date" report period parameter.

produce a separate report for each alternate payee account. If a customer has both accrual accounts and alternate payee accounts.

The payment summary report rules 1134 may include the following rules:

include data for any person or entity receiving payments for the period requested.

show the data associated with the alternate payee account separately if a customer has both member and alternate payee accounts, data included in this report is "as of" the "To" date parameter.

show pay date(s) for each customer in ascending order.

Basic allowance values may include all periodic and retroactive distribution element types: service retirement annuity, temporary annuity, additional contributions, ordinary disability, industrial disability, 10.06 benefit, survivor continuance, beneficiary allowance, and COLA.

COLA values include any periodic or retroactive COLA payments made in the report period.

Termination refunds values are refunded accumulated normal contributions (contributions and Interest on normal contributions)

Additional payments values are refunded accumulated additional contributions (contributions and interest on additional contributions)

Death benefits values include $1000 death benefit and the insurance benefit

Deductions include those for medical, dental, and vision

The check reconciliation and paid check report rules 1136 may include the following rules:

The data received from the bank will be brought into a staging area before importing into the system.

The system will check for file integrity and provide an operator notification if there is a problem with the file.

After importing the check numbers and amounts, discrepancies will be shown, referencing both the check number and amount received from the bank, in a discrepancy report identifying: (1) a discrepancy with the bank reported account total items on file; (2) discrepancy with the bank reported account total paid Amount; (3) a check number that does not exist in the system; (4) a check number Paid that has previously been marked Paid and note the customer record; (5) a check number paid that has been voided in the system and note the customer record; (6) check number paid that has been excluded and note the customer record; and (7) A check number paid and the paid amount is different than the payment amount in the system.

The operator is notified when a discrepancy report is generated.

Checks reported as paid in the reconciliation download are marked paid in the system.

The system should verify that items in the header data were received.

Account total items on file and account total paid amount

A report of paid checks may be requested for the reconciliation period covered in the download The paid check report is view only; an operator should not be able to manipulate content.

The paid check report contains all distribution payroll checks, both regular and special payroll, which were paid in the previous month.

The outstanding and stale check report rules 1138 may include the following rules:

The outstanding and stale checks report provides a list of unpaid checks. The information is determined from data in the PT system after receipt of data from an authorized bank on paid checks. It is run for the previous month but may reflect checks issued in any period.

This report is view only; an operator should not be able to manipulate content.

The report contains non-voided checks issued in any previous period that have not been marked paid.

Checks with issue dates that >=1 year are indicated as stale checks.

A user may not manipulate the data presented in this report.

The COLA report rules 1140 may include the following rules:

This report is view only; an operator should not be able to manipulate content.

If no one is in a COLA group (i.e. they all are deceased) show a place holder for the COLA group.

Beneficiaries are assigned to COLA groups (for example 32 for the year 2003, 33 for the year 2004) based on the benefactor's COLA group The member detail report rules 1142 may include the following rules:

The report is produced for: (1) all current and previous members in the system with contribution and PTSC balances in their accrual accounts for the requested reporting period (Plan-to-date); (2) all reserve or reciprocal reserve customers in the system with contribution and PTSC balances in their accrual accounts for the requested reporting period; and (3) all Suspense in the system with contribution and PTSC balances in their accrual accounts for the requested reporting period.

Exclude from the report employment accounts that were closed prior to the selected pay period's begin date.

Exclude customers from the report with no active accounts as of the selected pay period's begin date.

All types of accrual account contributions and PTSC balances, except alternate payee, are summed together in this report for a customer.

If a customer has an alternate payee account and other accrual accounts, the alternate payee contributions & PTSC are reported separately.

A report requested as of a pay period date may not be produced until the payroll feed has been accepted and interest has been transacted against it.

Include information up through the latest accepted payroll feed.

The "Last Payroll" date shown in the header will be the pay date as described in "IN01—Interest on accrual Accounts".

Dollar values on the report are shown as dollars and cents with dollar symbols, following standard rounding rules.

Contribution rate is shown on the member detail report: (1) contribution rate in effect on the pay date for the selected pay period; and (2) on reports for an Alternate Payee account this is the rate associated with the most recent source account when the account was split The contribution and PTSC values are derived from all accrual and buyback accounts.

If the customer has no year-to-date-contributions or PTSC, show values as 0.00.

The annual statement report rules 1144 may include the following rules:

The report is produced for: (1) all current and previous members in the system with contribution and PTSC balances in their accrual accounts for the requested year; (2) all reserve or reciprocal reserve customers in the system with contribution and PTSC balances in their accrual accounts for the requested reporting period; (3) all Suspense. in the system with contribution and PTSC balances in their accrual accounts for the requested reporting period; and all alternate payees If the customer has an alternate payee account it is reported separately.

Exclude customers from the report with accounts that were closed prior to the reporting period.

Contributions and PTSC balances for all of the customer's accrual account types (including buyback payments received), except alternate payee, are summed together in this report.

The report is produced for the payroll periods 1 through 26 or 27 of the requested year.

The payrolls included in this report may be accepted in the system before the report may be run.

Interest transactions through the pay date associated with last payroll period 26 or 27 if applicable may have been run and posted.

Dollar values on the report are shown as dollars and cents with dollar symbol, following standard rounding rules.

If the customer has no annual accrual (year-to-date) contributions or PTSC, show values as $0.00.

Plan entry date shown is [–] (earliest on record) if multiple plan entry dates exist.

Beginning balance=plan-to-date balances shown on previous year's annual report.

Annual accrual=sum of all accumulated contributions included in the payroll periods covered by this report.

Plan-to-date=beginning balance+annual accrual

Total accumulated contributions and interest=sum of normal and additional contributions values in each column Pension trust service credits earned in [Year]=PTSC received in payrolls 1 to 26.

Total pension trust service credits earned as of [date shown in report period field]=

All PTSC on account through the end date of payroll period 26.

Sort order for printing all statements is in ascending order by last name.

The salary history report rules 1146 may include the following rules:

Display rows by hourly rate and monthly Rate

Each row is described by the starting and ending year and pay period for the period and dates the salary was in effect.

monthly salary=hourly rate of pay×173.333

Effective date is the date of the salary event (the date the increase or decrease was effective)

where type & BU are not available show nothing.

The estimated unmodified report rules 1148 may include the following rules:

Data should be projected and displayed for each of 16 years incrementing by year from the retirement date entered in the Estimator (and including the retirement date).

Projected data should be sorted by date of retirement in ascending order.

For "Hire Date" show the hire date associated with the first employer record received. (There may be multiple hire dates—one for each new employment.)

For "Plan Entry Date" show the EARLIEST entered Plan Entry Date (Plan Entry Dates do not change but the contribution rate derived from the use of the Plan entry date and member birth date may be adjusted. When a member accrues service and then becomes a Reserve member—if they return to County Employment their Plan Entry date doesn't change BUT the contribution rate they are assigned upon return is adjusted to reflect their absence—the years they were in Reserve status are added to their age at entry—the age at entry is based on the original Plan Entry Date)

For "Employer Group" show the most recent Employer Group

For "Based on Average Salary of" show the Final Compensation dollars from the Estimator with a dollar sign. Since this number shows up later in the report correctly labeled as Final Compensation we probably may get rid of it here.

For "Normal Hours per Pay Period" show the Normal Hours Worked from the most recent Employer Group For "Termination Date" show the termination date.

For "Cap" show Cap associated with most recent employer group

For "Date of Retirement" show the date in mm/dd/yyyy

Projected ages are based on retirement date and date of birth and shown as the age on the retirement date. The age factor selected will the one that reflects the "Attained Quarter Age"—in other words if a members is 50.4 years at retirement the benefit factor used will be the one associated with 50¼. Also if the age at retirement is 50.6 the attained age will be 50½.

Projected factors are derived from "benefit factor attained quarter age the single premium.xls" table is used for the options and the reserve calculations and are based on whole age for each year shown on the report Projected service credits are calculated based on the most recent PTSC received in the automated payroll feed based on normal hours or upon changes to normal hours in the generic calculation mode.

Final Compensation is projected based on the operator entered dates or from the retirement date back 12 or 36 months (or the higher consecutive 12 or 36 months discovered by the system).

Estimated monthly benefit=Factor×PTSC×Final Compensation

The estimated benefit calculations factors report rules 1150 may include the following rules:

This multi-page report is a report that is internal to the PT. It is used by the benefits counselor to record and place in the customer file a record for final retirement calculations. May be viewed/printed anytime.

Data shown in this report is from the customer in context, based on operator entries, reference data and system retirement calculations.

The reciprocity rules 1152 may include the following rules:

Reciprocity may be recorded in the Pension Trust system in order to support the administration and distribution of benefits:

Employment with reciprocal systems may help the user to establish the minimum service requirements.

Employees entering the pension trust from a reciprocal agency may use the age they were hired at the reciprocal agency as the pension trust plan entry age to receive a lower contribution rate. (reciprocal in)

Employees leaving the pension trust for a reciprocal agency have the right to leave their contributions on deposit even if they were not vested (reciprocal reserve)

When electing retirement concurrently from the pension trust and the reciprocal agency, the final compensation with a reciprocal agency is considered in retirement benefit calculations.

Death and disability benefits for someone who is Reciprocal Reserve and also a participant of the pension trust may be coordinated by the user Reciprocal employment information is considered when calculating retirement or disability benefits using the system calculator function.

A member may be distinguished as reciprocal incoming or outgoing.

A pension trust user may add or modify a list of reciprocal agencies.

A user may generate a reciprocity verification form letter from the system.

The tax withholding rules 1154 may include the following rules:

FIT and SIT deductions are calculated on the gross monthly allowance paid to the recipient. For lump sum distributions of contributions, taxes are calculated and withheld on the pre-tax portion of the contributions (post tax contributions are exempt since they have already been taxed).

Distribution tax code is a required field

Taxes are calculated by the system based on operator entries and tax tables in the database.

Federal Taxes may be calculated using the Percentage method for Monthly payroll periods.

For FIT the following tables are required: IRS Table 4 Monthly Income/Single or Married, IRS Table 5 Exemption Allowance.

State Taxes may be calculated using the Exact Calculation method.

For SIT the following tables are required: State Table 5 Monthly Income/Single, Married or Unmarried Head of Household), State Table 1 Tax Rate Table (Low Income Exemption), State Table 2 (Estimated Deduction Allowance Table), State Table 3 Standard Deductions Monthly (Single/Married/Unmarried H o H), State Table 4 Monthly with One allowance Exemption Allowance Table Federal Tax withholding is established on form W4-P. If no W4-P is on file, the Federal tax will default to M-3.

State Tax Withholding is established on form DE 4P. If no DE4P is on file, the State Tax will default to the withholding election on the recipients W4-P. If no W-4P and no DE-4P is on file then the State withholding will default to M-3.

The operator may override the State Tax default when no DE4P is on file, Per Tax Counsel, the payer (in this case the Pension Trust) may opt for one of two methods when there is no federal or state form on hand. The payer may withhold State taxes on the same basis as Federal taxes (M-3) OR the payer may withhold 10% of the federal tax withheld. In this situation (no withholding certificates on file) the default of M-3 is used for periodic (IRS distribution type) payments. Non-periodic and eligible rollover distribution withholding is at the 10% rate. If other behavior is desired they may use the "State Custom % or $" withholding election type.

The form 1099R rules 1156 may include the following rules:

1099R forms will be designed to conform to current IRS specifications.

Per IRS instructions, 1099Rs are generated per distribution account for each customer The generation and printing of 1099Rs are separate processes controlled by the operator.

All payments made and taxes collected within the calendar year shall be included in 1099R generation for an operator selected year. The date payment is made=paycheck date.

1099Rs are generated when customers with distribution accounts also have a value in the SSN/Tax ID field where "Is Tax ID" flag is also indicated.

The system will reflect that a 1099R has been generated for a Distribution Account.

A corrected 1099R will be marked Corrected on the form that is printed and on the file sent to the IRS.

An original or corrected 1099R may not be printed or re-printed until the original or corrected 1099R has been generated and accepted as ready for filing.

1099Rs cab be viewed after generation and before printing in order by SSN

1099Rs are printed in order by SSN.

1099Rs are printed with a reference number (1, 2, 3 etc.) outside the defined template area to facilitate the staff in recovering from a print failure FIG. 12 is a diagram illustrating the set of retirement business rules 746 shown in FIG. 7 according to one embodiment of the invention. The set of retirement business rules 746 includes at least one of estimator page calculations and conversions rules 1210, calculations page calculations and conversions rules 1220, unmodified page calculations and conversions rules 1230, option one calculations and conversions rules 1240, option two calculations and conversions rules 1250, option three calculations and conversions rules 1260, estimate/calculation conversion rules 1270, re-hire calculations and conversions rules 1280, refund of contributions rules 1290, and reserves calculations and conversions rules 1295.

The estimator page calculations and conversions rules 1210 include the following rules:

Termination and retirement dates may be in the past, present or future.

If the customer is in context the system determines and displays highest average monthly compensation earnable (rate of pay, not earned pay) based on a 12 or 36-month consecutive period and consecutive months of earned compensation. This period may span any consecutive 12 or 36 month period regardless of employer and may include time with a reciprocal agency or time while on LWOP.

If the customer has LWOP use the salary received before LWOP for calculating highest salary for the LWOP period.

Benefits paid to the member under section 10.06 are included in the high salary calculations. Note that PTSC are not provided with a 10.06 benefit, since the benefit is meant to supplement the member's salary from the employer.

The operator will enter the reciprocal compensation data if it is not already in the system.

Monthly salary/compensation is calculated=Hourly Rate Of Pay×80 hours×26 pay periods/12 months Final compensation is calculated by taking a weighted average of the sum of high salary*whole or fractional month for each of the periods included in the calculation.

An estimate may be saved as a pending calculation associated with a customer and may be recalled and modified.

Include employer pick-up for employee when determining salary/compensation when salary/compensation was received under BUs that have this option specified in the employer group.

An alternate payee's retirement date may be =>than the first date of eligibility of their former spouse An alternate payee is eligible to retire with less than 5 PTSC, if the member with the source account was vested at the time of split.

If the customer has multiple alternate payee accounts, each one is calculated separately for a retirement. They may not combine contributions or PTSC into one retirement.

A pending retirement may be cancelled.

The calculations page calculations and conversions rules 1220 may include the following rules:

An alternate payee account may only be converted to a service retirement.

An eligible survivor may be a: dependent child under 18 years of age (or per court order), dependent parent (per court order), or a spouse that has been married to a member who is eligible to retire at least one year before the member's date of death (in case of an active member death), or married to the Retiree at least one year PRIOR to the Retirement Date.

Calculations:

Age at retirement=last attained quarter age based on date of birth and the retirement age entered Age nearest birthday=the age on the birthday that is nearest to the retirement date (whole number)

Annuity Factor=a cross reference between the Retirant quarter age and years certain.

Option One Annuity Factor is determined with a cross reference between Annuity Factor+3.

Option One Reduction Factor=Annuity Factor/Option One Annuity Factor

Option Two Factor (100% continuance)=Cross reference of Age Nearest Birthday and Survivor/Beneficiary's Age Nearest Birthday in the Joint Survivor (JS) reference table for Option Two.

Option Three Factor (50% continuance)=Cross reference of Age Nearest Birthday and Survivor/Beneficiary's age nearest birthday in the Joint Survivor (JS) reference table for Option Three.

Temporary Annuities are not calculated for ordinary or industrial disabilities

Social Security Factor=A cross-reference between the retirant's whole age and last attained quarter age.

Final Compensation from estimator form/process.

Retirement Service Years=(Total PTSC accrued and/or bought back while a Member of the SLO county Retirement Plan)+(total PTSC projected at the current rate if there is no Termination Date)

Calculated Pension Portions for Temporary Annuity, from unmodified form.

Personal Retirement Contributions to Date of Retirement=the sum (default display is contributions to date) of all accumulated Normal Contributions, including interest, from all Accrual and Buyback Accounts projected through the date of retirement.

Employee Additional Contributions to Date of Retirement=the sum (default display is contributions to date) of all accumulated Additional Contributions projected thru the date of retirement. Total Account Balance Including Employee Additional=Accumulated Contributions Reciprocal years in service count toward vesting but are not included in PTSC calculations The unmodified page calculations and conversions rules 1230 my include the following rules:

The unmodified allowance estimated monthly benefit may not exceed the % of final compensation per by the cap defined by employer group.

Unmodified Calculations for Service Retirement
  Total Unmodified Retirement Allowance=Retirement Age Factor×Total PTSC×Final Compensation
  Current Service Annuity=(Total Accumulated Normal Contributions/Annuity Factor associated with attained ¼ age)(entry in Col.0)/12
  Additional Contribution Calculation=(Total Accumulated Additional Contributions/Annuity Factor associated with attained ¼ age)/12
  Calculated pension portion=total unmodified retirement allowance−current service annuity
  Eligible survivor 50% continuance=total unmodified retirement allowance*0.50

Unmodified Calculations for Ordinary Disability Retirement
  If PTSC is at least 5 and up to but not including 10 then total unmodified retirement allowance=1.5×total PTSC×final compensation
  If PTSC is at least 10 and up to but not including 22.222 then total unmodified retirement allowance=33.3%×final compensation
  If PTSC is greater than 22.222 then total unmodified retirement allowance=1.5×total PTSC×final compensation
  Current service annuity=(total accumulated normal contributions/annuity Factor associated with attained ¼ age)/12
  Additional contribution calculation=(total accumulated additional contributions/annuity factor associated with attained ¼ age)/12
  Calculated pension portion=total unmodified retirement allowance−current service annuity
  Eligible survivor 50% continuance=total unmodified retirement allowance*0.50

Unmodified Calculations for Industrial Disability Retirement
  Total unmodified retirement allowance=0.50×final compensation
  Current service annuity=(total accumulated normal contributions/annuity Factor associated with attained ¼ age)/12
  Additional contribution calculation=(total accumulated additional contributions/annuity factor associated with attained ¼ age)/12
  Calculated pension portion=total unmodified retirement allowance−current service annuity
  Eligible survivor 50% continuance=total unmodified retirement allowance*0.50

Temporary Annuity Options Calculations for Service Retirement (Not applicable to calculating Ordinary or Industrial Disability)
  Social security estimate=from calculations form (provided by customer)
  Calculated pension portion=total unmodified retirement allowance−current service annuity
  (social security OR pension portion) increase=social security factor×the lesser value: social security estimate or calculated pension portion
  (Social security OR pension portion) decrease=the value used in calculating the Increase
  Total before 62 allowance=total unmodified retirement allowance+increase
  Total after 62 allowance=total unmodified retirement allowance+increase−the lesser value: social security estimate or calculated pension portion
  Note: the temporary annuity may exceed the CAP. The cap is on the unmodified only.

The option one calculations and conversions rules 1240 may include the following rules:
  The same factors used to calculate the CSA are used to calculate the additional contributions annuity.
  General rule: calculation of the options for service, ordinary disability, and industrial disability are the same, based on the tables for service retirement and disability retirement respectively.

Calculations:
  Option one current service annuity=current service annuity (CSA)×option one reduction factor.
  CSA=total accumulated normal contributions/annuity factor/12
  Option one reduction factor=annuity factor/option one annuity factor
  Option one total allowance=option 1 current service annuity+the pension portion (from the unmodified screen)
  Option one current service annuity, see CC04-001.
  The pension portion=unmodified allowance−CSA
  ((retirement age factor×total PTSC×final compensation)−(total accumulated normal contributions/annuity factor/12)
  Option One Accumulated Normal Contributions
    If no eligible spouse=total normal accumulated contributions
    If there is an eligible spouse=total normal accumulated contributions*0.5
  Option One Monthly Contribution Repayment
    If no eligible spouse=option one current service annuity (see CC04-001)
    If there is an eligible spouse=(current service annuity*0.5)−total Unmodified retirement allowance+option one total allowance Total unmodified retirement allowance=(retirement age factor×total PTSC×final compensation)
  Remaining balance to zero (the number of years before the remaining balance is zero)=option one accumulated contributions/monthly contribution repayment/12
  Automatic continuance (50% of the total unmodified retirement allowance, only if there is an eligible survivor)=0.50*(Retirement Age Factor×Total PTSC×Final Compensation)
  Total Before Age 62 allowance=option one total allowance+(social security factor×the lesser value: social security estimate or (total unmodified retirement allowance−current service annuity))
  Total after age 62 allowance=Total before age 62 allowance−the lesser value: social security estimate or the lesser value: social security estimate or calculated pension portion
  Calculated pension portion=(total unmodified retirement allowance−current service annuity)

The option two calculations and conversions rules 1250 may include the following rules:
  The option two for an additional contribution=the calculated unmodified additional allowance×option two factor.

Option Two Allowance Calculations:
When the Operator has Indicated an Eligible Survivor, Also Named Beneficiary Option two total allowance (the retirement allowance)= ((0.50×total unmodified allowance)×option two factor)+(0.50×total unmodified allowance)

Total unmodified allowance=retirement age factor×total PTSC×final compensation

Option two factor=cross reference the age of the retiree at retirement with the age of the survivor at retirement in the actuarial table.

Continuance to eligible survivor=100% of the option two total allowance When the operator has indicated a beneficiary, no eligible survivor Option two total allowance=total unmodified allowance× option two factor Continuance to beneficiary=100% of option two total, allowance Option two factor=cross reference the age of the retiree at retirement with the age of the beneficiary at retirement in the actuarial table. Refer to 100 percentJS.xls for the option two factor.

When the Operator has Indicated an Eligible Survivor not Named Beneficiary, and Also a Named Beneficiary Option two total allowance=(0.50×unmodified allowance)+((0.50×unmodified allowance)×option two factor)

Continuance to eligible survivor=50% of the unmodified allowance

Continuance to beneficiary=option two total allowance− the continuance to eligible survivor Option two total allowance is calculated before adding temporary annuity Temporary Annuity Options Calculations (from CC03)

Total before 62 allowance=total unmodified retirement allowance+increase

Total after 62 allowance=total unmodified retirement allowance+increase−calculated pension portion the lesser value: social security estimate or calculated pension portion Social security estimate=from calculations form (provided by customer)

Calculated pension portion=total unmodified retirement allowance−current service annuity (Social security OR pension portion) increase=social security factor×the lesser value: social security estimate or calculated pension portion (social security OR pension portion) decrease=the value used in calculating the increase The option three calculations and conversions rules 1260 may include the following rules:

The option two for an additional contribution=the calculated unmodified additional allowance×option two factor Calculations:

When the Operator has Indicated an Eligible Survivor, Also Named the Beneficiary Option three total allowance (the retirement allowance)= ((0.50×total unmodified allowance)×option three factor)+(0.50×total unmodified allowance)

Total unmodified allowance=retirement age factor×total PTSC×final Compensation

Option three factor=cross reference the age of the retiree at retirement with the age of the survivor at retirement in the actuarial table.

Continuance to eligible survivor=(0.50×total unmodified allowance)+(((0.50×total unmodified allowance)×option three factor)/2)

When the Operator has Indicated a Beneficiary, No Eligible Survivor

Option three total allowance=total unmodified allowance× option three factor

Continuance to beneficiary=50% of option three total allowance

Option three factor=cross reference the age of the retiree at retirement with the age of the beneficiary at retirement in the actuarial table. Refer to 50 percentJS.xls for the option three factor.

When the Operator has Indicated an Eligible Survivor not Named Beneficiary, and Also a Named Beneficiary Option three total allowance=((0.50×total unmodified allowance)×option three factor)+(0.50×Total unmodified allowance)

Continuance to eligible survivor=50% of the unmodified allowance

Continuance to beneficiary=(option three total allowance− the continuance to eligible survivor)

Temporary Annuity Options Calculations (from CC03)

Total before 62 allowance=total unmodified retirement allowance+increase

Total after 62 allowance=total unmodified retirement allowance+increase−the lesser value: social security estimate or calculated pension portion Social security estimate=from calculations form (provided by customer)

Calculated pension portion=Total Unmodified Retirement Allowance−Current Service Annuity (Social security OR pension portion) Increase=Social Security Factor×the lesser value: Social Security Estimate or Calculated Pension Portion (Social security OR pension portion) Decrease=The value used in calculating the Increase The estimate/calculation conversion rules 1270 may include the following rule:

Before the distribution manager may convert a retirement calculation to a distribution, the benefits Counselor role may indicate that it is ready to be converted The re-hire calculations and conversions rules 1280 may include rules applied for re-hire. The pension trust needs the ability to handle rehires. There may be three types of rehires: (1) a client who was laid off and returns to work within PT parameters; (2) a client who quits and returns to work; and (3) a retiree who returns to work The third type is called a reinstatement. The re-hire calculations and conversions rules 1280 may include rules to notify of a rehire, review pay period history, identify missing PTSC for full and/or partial pay periods based on PTSC for planned normal hours for the time type in the employer group that laid off the member; and calculate PTSC for the lay-off period.

During the new hire process PT staff may identify what accrual and distribution accounts exist(ed) to determine next functions. If the new hire process was omitted, the operator will have a notification that an accrual account is received for new employment for which there was no pending member record, providing another opportunity to review the accounts. The operator may then analyze if PTSC need to be adjusted for a former laid-off client, with accrual account balances, returning to employment with any employer group under the pension trust plan within 12 months of layoff. They may also determine if it is a returning suspense member who may pay interest. If the returning employee had previous service under the plan that had been refunded the system should so indicate that as well.

The refund of contributions rules 1290 may include the following rules:

When a termination date is received the system will also display the termination date as the accrual account stop date on the accrual account information page. The PT may institute a policy to wait 6 weeks past the pay period end in which the term date falls before processing and paying a refund.

A refund may not be issued if the pre-conditions are not met.

A refund may not be issued if there is a pending retirement calculation for the customer.

A refund is issued when there is an unsatisfied buyback contract results in the termination of the buy back contract.

The operator may have to "do something" to stop the buyback (whether or not the contract is satisfied) before a refund may be made.

The system will advise the operator if the refund may not be issued because business rules were not met.

After a refund has been requested and accepted by the operator in the system it may not be cancelled.

The date of the refund transaction is the date the operator completed the refund request, not the date the payment is made.

If a customer has regular accrual accounts and an alternate payee account(s), an alternate payee account is refunded in a separate distribution.

The reserves calculations and conversions rules 1295 may include the following rules:

The reserves page is a reference only page that displays information on how the retirement allowance is funded. A retirement allowance may never be fully funded from member contributions. The annuitized member contributions fund the current service annuity, while the balance of the monthly allowance, the current service pension (a.k.a. the pension portion) is funded from pension trust reserves.

The values on the reserves page detail the amounts that may be transferred in reserves.

Current service annuity reserve=total accumulated normal contributions=member deposits Pension reserve=(current service pension×annuity factor)×12

Beneficiary reserve is calculated and shown if the named beneficiary is eligible for an automatic continuance.

Beneficiary reserve=((1.000/option 3 factor)−1.000)×(current service annuity reserve+pension reserve))

Member deposits=current service annuity reserve

Calculate and display member deposits with lifetime annuity if the member elects a lifetime annuity as a method of distribution for Additional Contributions.

Member deposits with lifetime annuity=total accumulated contributions (normal and additional)

Current Reserves=Pension Reserve+Beneficiary Reserve

FIG. 13 is a diagram illustrating the set of employment and payroll business rules 750 shown in FIG. 7 according to one embodiment of the invention. The set of employment and payroll interface business rules include at least automated payroll rules 1305 and non-automated payroll rules 1310.

The automated payroll rules 1305 include rules to take data from an employer who has a contract with the pension trust, stage the data for validation, and to import the data into the production database.

The non-automated payroll rules 1310 may includes the following rules:

The Pension Trust may be able to enter payroll information for employers that do not have an automated payroll feed process. For each employee, information such as address, contribution, and employment events are entered by the operator. Once the information is entered it is submitted to the system for review and acceptance (or rejection).

All transaction and employment event information entered will be associated with the pay period defined in the NAP template.

FIG. 14 is a diagram illustrating the set of self-service business rules 760 shown in FIG. 7 according to one embodiment of the invention. The self-service business rules 760 includes at least one of self-service (SS) log-on rules 1410; SS buyback calculations rules 1420; SS rate and benefits calculators rules 1430; SS client personal data rules 1440; SS inquiries, forms, and static data rules 1450; and SS look-and-feel rules 1460.

The self-service (SS) log-on rules 1410 include rules that perform SS logon operations at the self-service website 250. Typically, a logon is not required to view the home page, view static pages, view/print/download static forms, use the "simple" benefit calculator, view and use the rate calculator, initiate inquiries, and calculate a buyback—no customer in context. An SS operator logon is required to view the operator's personal profile and demographic information, accounts, relationship and beneficiary designations, 1099Rs, calculate service retirement benefits, and fill out and submit web forms (e.g., requests for buyback, request for retirement estimate, and change personal data).

An SS-EP operator, like a regular SS operator, has permission to view his/her own records and use the same functions/features available to an SS operator. They may not view any other participant's records. The SS and SS-EP operators may not view a beneficiary's information. An SS customer may initiate on-line registration which results in system creation of a login ID. Typically, SS-EP users are set-up by the pension trust. The system prevents duplicate registrations. The SS client may be authenticated during the registration process before a login ID is provided. SS logons created through the on-line registration method may have a default SS security role. A PT operator with rights may create and modify an SS operator login ID and/or password. The system may assign as logon IDs the e-mail address provided during the registration process. SS Operator passwords may be alphanumeric, up to a pre-determined number of characters in length with a minimum length of characters and any combination of characters, numbers, etc.

The SS buyback calculations rules 1420 may include the following rules:

When an estimate is requested the system assumes the payment start date is the employer payroll date that is two periods beyond the customer's current payroll date. Note: verbiage on the website will explain this assumption.

The SS operator may not save an estimate.

The SS rate and benefits calculators rules 1430 may include the following rules:

Rate Calculator:

The rate calculator may be able to calculate a contribution rate for a self service website visitor Benefits/Payment Calculator:

Provide the user with the ability to do retirement estimations for scenario planning and projecting using information from their records (customer in context).

For non-members who are considering employment with the county, they may have the ability to run ad-hoc estimates as on the current web site. This functionality may be available for any self service website visitor.

The SS client personal data rules 1440 may include rules to allow a logged-in self service user to view much of their customer information and modify a very limited set of their information. The information available for viewing may include self service user ID, customer profile of name, SSN, address, phone number(s), email addresses, plan entry date, birth date, accrual account information, accrual transaction history, accrual employment events, distribution account information and summary, check history, 1099R history, annual report, member detail report (current), buyback contracts (type, total payments, remaining balance, remaining payments, recurring payment amount). The information available for modified may include the user ID and password.

The SS inquiries, forms, and static data rules 1450 may include the following rules:

- PT staff may have the ability to periodically update content on the static pages of the self service site.
- PT staff may have the ability to update static documents out on the self service site. Note: these are usually PDF documents.
- Self service visitors may be able to send e-mail inquiries to PT staff.
- Email inquiries from self service visitors may be routed to the appropriate PT staff member based upon the type of inquiry. For example, a retirement inquiry should be routed to the benefits counselor.

The SS look-and-feel rules 1460 include rules to provide look-and-feel functionality. These rules may include the following:

- A secure (HTTPS) URL is used to access the self-service website.
- User may register for access to the site.
- Logon information may be mailed to the client's payroll address.
- Users may be authorized to access personal data.

Figure 15:
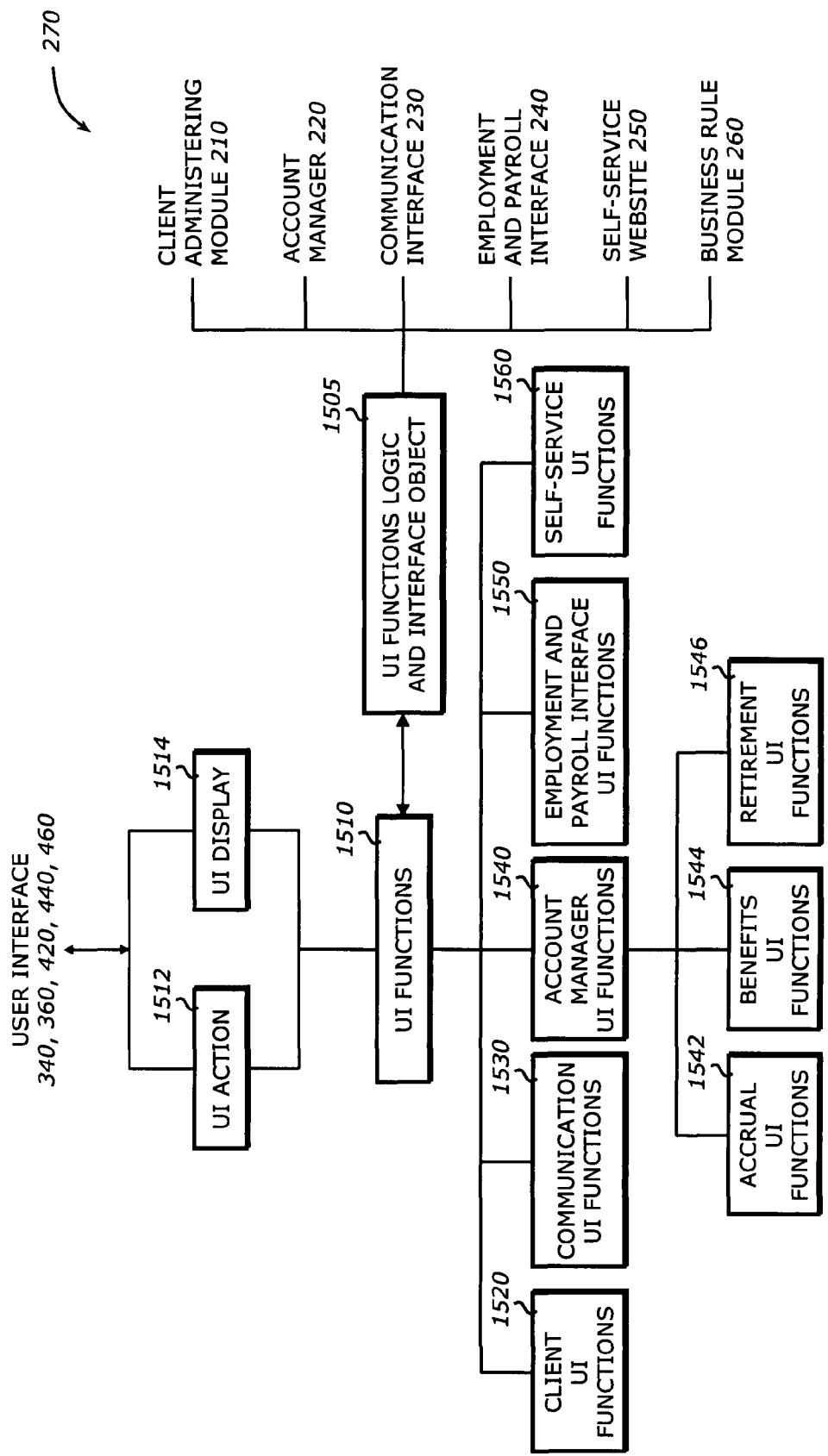
FIG. 15 is a diagram illustrating a UI module according to one embodiment of the invention.

FIG. 15 is a diagram illustrating the UI module 270 shown in FIG. 2 according to one embodiment of the invention. The UI module includes a UI logic object 1505 and a set of UI functions 1510.

The UI logic object 1505 interfaces to at least one of one of the client administering module 210, the communication interface 230, the account manager 220, the employment and payroll interface 240, the self-service website 250, and the business rule processing module 270 to activate or apply the corresponding functions in the set of UI functions 1510.

The set of UI functions 1510 includes at least a set of client UI functions 1520; a set of communication UI functions 1530; a set of account manager UI functions 1540; a set of employment and payroll interface UI functions 1550; and a set of self-service UI functions 1560. The set of account manager UI functions 1540 includes at least one of a set accrual UI functions 1542, a set of benefits UI functions 1544, and a set of retirement UI functions 1546. Each of these UI functions is used in the associated module. For example, the set of client UI functions 1520 is used with the client administering module 210.

The UI functions 1510 may include a UI action 1512 and a UI display 1514. The UI action 1512 and the UI display 1514 are interfaced to the user interface of the associated module or object such as the operator UI 340, the customer UI 360, the accrual UI 420, the benefits UI 440, and the conversion UI 460. The UI of the various modules or objects may include interfaces to entry input devices such as keyboard, mouse, etc. or display screen. The UI functions 1510 may include functions that are provided by the business rules in the associated modules.

The UI action 1512 performs an action in response to the user's or operator's input. An action may be any suitable action such as generating a command, clicking a mouse, entering an entry, selecting an option, navigating through pages, editing, uploading a file, downloading a file, etc.

The UI display 1514 provides a display function on the appropriate window or page such as pre-populating data, highlighting, showing a dropdown list, etc.

FIG. 16 is a diagram illustrating the set of client UI functions 1520 shown in FIG. 15 according to one embodiment of the invention. The set of client UI functions 1520 includes at least one of address UI functions 1610, contact information UI functions 1620, customer profile UI functions 1630, pending member UI functions 1640, link relationships UI functions 1650, and search function UI functions 1670.

The address UI functions 1610 include a function to display components of the client address such as address line 1, address line 2, city, state or province, and postal code.

The contact information UI functions 1620 include a function to display telephone numbers with separation between area code, prefix, and last four digits. The format of the telephone numbers is automatically performed.

The customer profile UI functions 1630 may include functions to attach a note to the customer marked to always appear when accessing the customer record (high visibility note), to display the customer's relationships in summary fashion when on the benefactor or beneficiaries pages, to display the customer's accounts in summary fashion when on the accrual account and distribution pages, and to prominently display member class and bargaining unit on the customer main page The pending member UI functions 1640 may include the action and/or display functions to allow the user to enter new pending members; to input and save pending member member class, employer, and bargaining unit; to input and save pending member plan entry date, age; to enter and save pending member first name, middle initial, and last name, SSN, reciprocal system information and/or former PT information, and to calculate the contribution rate based on the operator entries.

The link relationships UI functions 1650 may include display functions to display the relationship's first, middle name if any, and last name on the Relationship page, relationship type (e.g., spouse, child, etc.) on the relationship page for a relationship, and benefit qualification (e.g., survivor, beneficiary, none) on the relationship page for a relationship; and action functions to allow the user to click on a relationship to access the client profile associated with the relationship, and to allow the user to navigate to and from the client and relationship record.

The search function UI functions 1670 may include display functions to display search results sorted from ascending to descending and back; and action functions to perform the following:

- To allow the user to select a match and to be taken to the customer profile.
- To allow the user to navigate to and from the search results and other windows.
- After a user selects a match, an indication of what match was selected remains until the Search window is closed.
- In advance search (not quick search), the user may elect to clear all search criteria or delete or type over previously submitted criteria and re-submit.
- The mouse wheel (if present) may scroll the content of the search results.
- The keyboard page-up, page-down, and arrow keys may scroll the search results.
- The search results may be sorted when the mouse is clicked in the header of the column to sort.

Search results include the following information: SSN, first name, last name, middle initial, and employer group.

FIG. 17 is a diagram illustrating the set of communication UI functions 1530 shown in FIG. 15 according to one embodiment of the invention. The set of communication UI functions 1530 includes at least one of forms and letters UI functions 1710, look-up and data reference manager UI functions 1720, log-on and password UI functions 1730, customer notes UI functions 1740, operator and system notifications 1750, pension trust operator UI functions 1760, and operator security UI functions 1770.

The forms and letters UI functions 1710 may include the following action and/or display functions:
  With a customer in context the operator may generate a word document from a defined template.
  The operator may print static forms from the system (no customer data required to be inserted).

The look-up and data reference manager UI functions 1720 may include the following action and/or display functions:
  An operator may add/modify: employer, member classification, bargaining unit, distribution tax codes, COLA Groups, COLA group %s, reciprocal entities, banks and associated routing numbers, social security factor.
  An operator may set-up employer groups and map to employer, member classification and bargaining unit.
  An operator may add/modify a medical deduction pick-up amount and associate with an employer group.
  An administrator may upload reference data files: contribution rates, annuity factors, joint/survivor table for option 2 service retirements, joint/survivor table for option 2 disability retirements, joint/survivor table for option 3 service retirements, joint/survivor table for option 3 disability retirements, attained age factor tables, tax withholding tables (e.g., distribution tax withholding rate, allowance, state standard deduction, state low income exemption schedule, and schedule header)

The log-on and password UI functions 1730 may include the following action and/or display functions:
  The user is allowed to enter user ID and password at initial launch of application.
  Password field only displays a position character and not the password (usually a '*' character, but may be a "●").

The customer notes UI functions 1740 may include the following action and/or display functions:
  High visibility notes may display in a bolded format that clearly signals the user.
  High visibility notes may be displayed before other notes.
  Most recent notes should be displayed first.
  Notes are automatically time/date stamped and annotated with the user's initials or, if the note is system generated, the name of the system.

The operator and system notifications 1750 may include the following action and/or display functions:
  Personal notifications and notifications assigned by the operator to other operators are also listed on the general list with system generated notifications.
  An operator may link an operator generated notification with the client record.

The pension trust operator UI functions 1760 may include the following action and/or display functions:
  Only a PT administrator may open the operator profile.
  Ability to edit name of operator.
  Ability to edit address, e-mail, and phone of operator.
  Ability to quickly select security roles that the operator qualifies for.
  Ability to add a NEW operator.

The operator security UI functions 1770 may include the following action and/or display functions:
  Only a PT administrator may open the operator security role profile.
  Ability to quickly select users that qualify for the security role.

FIG. 18 is a diagram illustrating the set of accrual UI functions 1542 shown in FIG. 15 according to one embodiment of the invention. The set of accrual UI functions 1542 includes at least one of accrual accounts UI functions 1805, distribution account UI functions 1810 and accrual accounts interest UI functions 1830.

The accrual accounts UI functions 1805 may include the following action and/or display functions:
  There needs to be a summary view of an accrual account when a customer in context.
  The account detail window will allow the PT staff to edit start date, stop date, reciprocal information (entry age), bargaining unit, member class, and employer.
  A summary detail of all accrual transaction history is displayed on the main application window when the accrual account is selected.

The distribution account UI functions 1810 may include the following action and/or display functions:
  A payment may have a scheduled start date.
  A payment may have a scheduled stop date.
  A payment may be placed on hold.
  A distribution account may be made inactive (closed).
  Payments may be made by check or via ACH transmittals.
  An operator may make a retroactive payment
  An operator may assign a COLA group at the distribution account level.
  An operator may record the amount of SSA benefits, against which retirement benefits are coordinated.
  An operator may make an adjustment (positive or negative) to a distribution account transaction.
  Provide a detailed summary by distribution account type to include: distribution account [dropdown list], start date, retirement date, stop date, COLA group name, account status, element sum total, taxes sum total, deductions sum total, net sum, and tax withholding election.

The accrual accounts interest UI functions 1830 may include the following action and/or display functions:
  The page displays a payroll the day after it is accepted and the current date is past the pay date (to allow for adjustments to be posted).
  A payroll for an employer will not show up on the page unless all previous payrolls for the employer have been accepted and interest run against them.
  The UI displays: employer, pay date (with hover that displays message: "includes adjustments up through the [date] pay date and contributions. received prior to pay period [current pay period displayed], pay period year/number, rate on normal contributions, rate on additional contributions, and rate on employer contributions
  The operator may elect to apply interest by employer by payroll period.
  The operator may see the effective interest rate(s).

Figure 19:
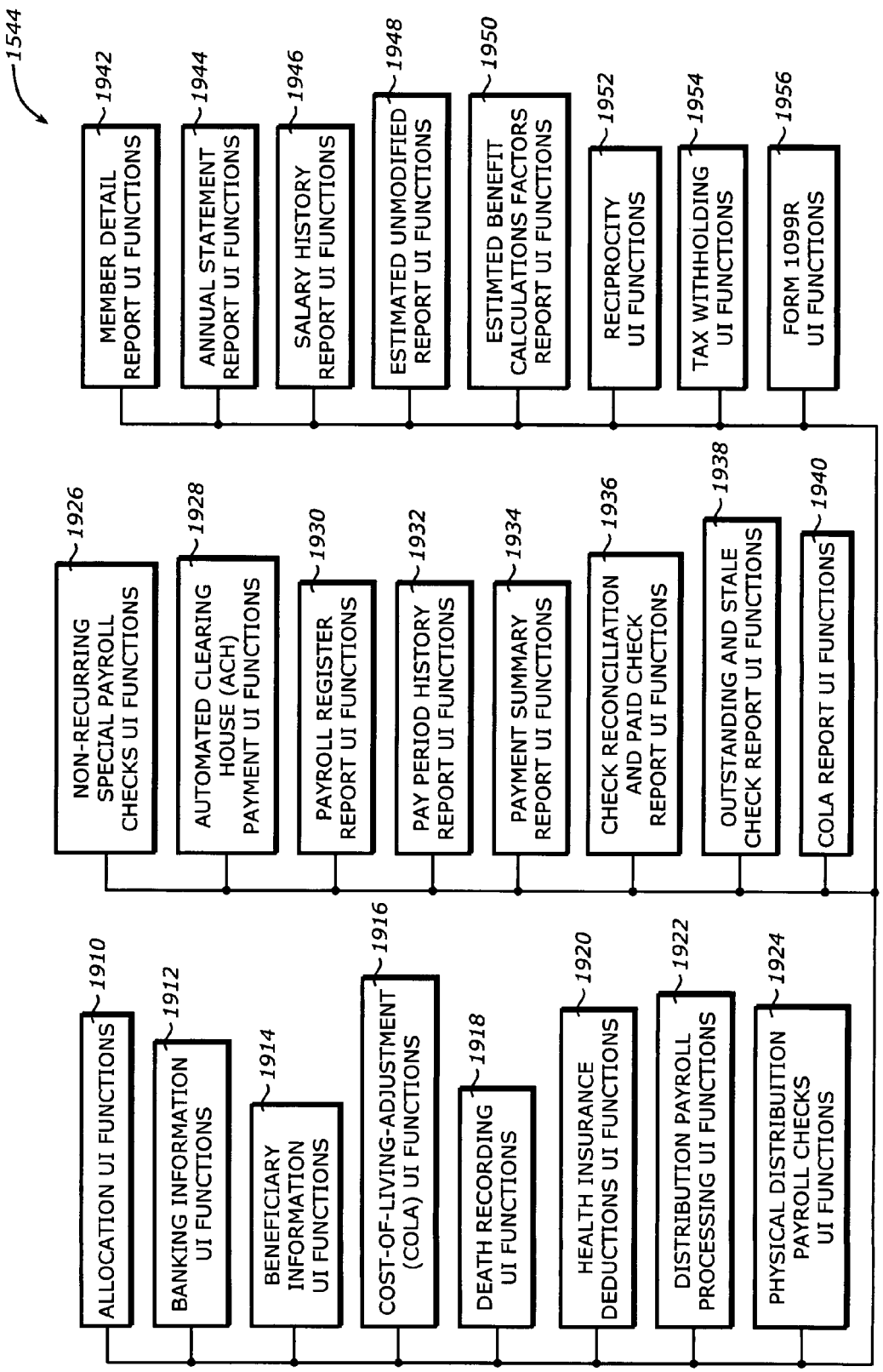
FIG. 19 is a diagram illustrating a set of benefits UI functions according to one embodiment of the invention.

FIG. 19 is a diagram illustrating the set of benefits UI functions 1544 shown in FIG. 15 according to one embodiment of the invention. The set of benefits business UI functions 1544 includes at least one of allocations UI functions 1910, banking information UI functions 1912, beneficiary information UI functions 1914, cost-of-living-adjustment (COLA) UI functions 1916, death recording UI functions 1918, health insurance deductions UI functions 1920, distribution payroll processing UI functions 1922, physical distribution payroll checks UI functions 1924, non-recurring special payroll checks UI functions 1926, automated clearing house (ACH) payments UI functions 1928, payroll register report UI functions 1930, pay period history report UI functions 1932, payment summary report UI functions 1934, check reconciliation and paid check report UI functions 1936, outstanding and stale check report UI functions 1938, COLA report UI functions 1940, member detail report UI functions 1942, annual statement report UI functions 1944, salary history report UI functions 1946, estimated unmodified report UI functions 1948, estimated benefit calculations factors report UI functions 1950, reciprocity UI functions 1952, tax withholding UI functions 1954, and form 1099R UI functions 1956.

The allocations UI functions 1910 may include the following action and/or display functions:
- The operator may choose to split the payment among multiple allocation types.
- The operator may choose the method of payment for each type (check or ACH).
- The operator may indicate a mailing address and payee name for split payments made by check to the participant's designated payee(s). The payees do not need to be set-up as customers in the system.

The banking information UI functions 1912 may include the following action and/or display functions:
- To display the banking information with the following data entry fields: Total payment amount, bank ABA transit number, bank name (when adding new ABA number only, otherwise it is auto-populated when ABA number is selected form the look-up), bank account number, type of account, distribution %, and status.

The beneficiary information UI functions 1914 may include the following action and/or display functions:
- The user will be able to see current and previous beneficiaries.
- If the percent entered for spouse is not 100% the system provides a warning.
- If the percent entered for two or more beneficiaries does not equal 100% the system provides a warning.
- The operator is responsible for determining a valid relationship type.
- A notification is provided when any paid allowances equal the death benefit
- Provide an alert when attempting to add a new spouse when a spouse already exists.

Change of Beneficiary—Benefit Recalculations:
- The operator may utilize the estimator/calculator functionality to estimate and re-calculate the modified retiree and survivor allowances. Note: no changes are made to the actual distribution account.
- The system (within the estimator) displays the re-calculated amounts.
- The operator may make modifications to the retiree allowance to reflect any changes in benefits.

The cost-of-living-adjustment (COLA) UI functions 1916 may include the following action and/or display functions:
- An operator initiates the application of COLA increases.
- An operator may initiate the COLA increase by individual group or globally to all qualifying benefit accounts per the percents defined by group in the reference tables.
- COLA increases are applied per formula against total benefits including previous COLAS.
- An operator may enter a COLA percent Ad Hoc, in addition to the annual COLA, and define a specific period in which a retirement became effective or a death occurred to initiate a COLA increase.
- A free-form field is provided to describe the COLA, for example to note it was an Ad-Hoc COLA.

The death recording UI functions 1918 may include the following action and/or display functions:
- Summary of accounts on the RAD page should display: account type and status, an indication of the customer's vested status when accrual accounts are summarized (Note: the alternate payee vested status is shown separately), and an indication of the retirement option (unmodified, option 1, 2, 3)) when a distribution account is summarized
- The operator may indicate if it is death of a member, retired participant, beneficiary, reserve participant or alternate payee.
- The operator may choose to work with the participant's accrual account, alternate payee account, or other account.
- If a member death is indicated the system will display information used in the basic death benefit calculation: amount of accumulated contributions, completed years of PTSC, member's rate of pay at the time of death, and beneficiary and/or survivor information
- The operator may indicate the receiver(s) of the basic death benefit.
- The operator may indicate the date that the settlement form was received.
- The system will display the formula used to calculate the death benefit and the result of the calculation.
- The formula may be modified by the operator.
- The operator may override the results of the calculation
- The operator may elect to make the death benefit(s) ready for distribution or place distribution of the calculated benefits on hold.

The health insurance deductions UI functions 1920 may include the following action and/or display functions:
- The system will display search results of plan codes from which the operator may select.
- Display of plan codes includes descriptors of the coverage, category, and any other information that will assist the operator in making an informed selection.
- The operator may enter the names of persons covered under the health plan. This is a free form field for PT staff only and is not used for reporting purposes.
- After entry of plan code the system will display the plan code, descriptor, monthly premium, employer pickup, and adjusted monthly deduction.
- The operator may indicate that the monthly deduction is paid out-of-pocket by the participant. Values for gross premium, employer pick-up, and adjusted value are still displayed.
- An operator may modify the health plan selection.
- An operator may stop the health care deduction.

The distribution payroll processing UI functions 1922 may include the following action and/or display functions:
- An operator may initiate the generation, re-generation, printing, voiding and acceptance of a payroll.
- An operator may view batch status: If a non-recurring batch is empty, that is, has no distributions added to it, if a recurring batch was re-created, and f any batch is ready to generate, partially generated, exception, void, generated, printed, or accepted.
- An operator may view the status of a payment (for each allocation): exception, excluded, generated, voided, replaced, paid, printed, unpaid, and collection An operator may mark any payment after accept as paid, unpaid or collection.

An unpaid payment may be marked paid by an operator or by the system as a result of the bank reconciliation.

A payment marked unpaid may be voided, and then replaced by an operator

Recurring periodic distributions and payments may be excluded from a recurring batch. This allows the PT to conduct research and to determine if it should be un-excluded (before print) or continue with the exclude and print the batch without it. Exclude removes it from the batch. If after the recurring batch is printed it is determined the payment should be made, the operator may recreate the distribution and assign it to a non-recurring batch. Note that these are still considered periodic (recurring) distributions and payments.

An operator may name the batch to differentiate it from other non-recurring batches.

An operator may add or remove a distribution to/from a non-recurring payroll batch any time before the batch is accepted.

The operator may exclude a distribution.

The operators may un-exclude a distribution.

If it's original batch has been accepted the operator may recreate an excluded distribution which adds the distribution to a nonrecurring payroll batch, presumably after the distribution was modified to address any problems.

Exclusions appear in the UI.

An operator may remove a distribution from a non-recurring payroll batch.

An operator may elect to reprint a single, multiple or all payments after print. The physical distribution payroll checks UI functions 1924 may include the following action and/or display functions:

Check values may be previewed before printing.

An operator may create a comment that is <=250 characters to print on an individual statement in the distribution payroll run.

An operator may create a comment<=250 characters to print globally on all statements in a payroll run.

The pay-period is clearly shown on related distribution payroll pages.

The operator may create checks allocated for support or garnishment without the payees name and address being set-up as a customer.

The operator needs the ability to include a reference on the check to the participant's account number receiving the rollover (if available)

For rollovers the operator needs to be able to enter distribution check mailing address of either the custodian or the member The non-recurring special payroll checks UI functions 1926 may include the following action and/or display functions:

The operator may indicate the special payroll date when setting up the paycheck. This date specifies the date to be printed on the check.

The operator may select to create a replacement check or a payout.

The operator may enter tax distribution codes for one-time payouts. A one-time payment may be taxed or untaxed.

For replacement checks the operator may select the original payment from a list of pay dates and check numbers or search by check number.

For a one-time payout, the operator may select the element type

For a one-time payout, the operator may enter or calculate the amount.

Check values may be previewed before printing.

An operator may create a comment that is <=250 characters to print on an individual statement in the payroll run.

An operator may create a comment<=250 characters to print globally on all statements in a payroll run.

Non-recurring special check payroll batches are clearly differentiated from recurring regular payroll batches on the distribution payroll page.

The operator may create checks allocated for support or garnishment without the payees name being set-up as a customer.

The operator may enter a memo on the check (to either reference the original owner of the distribution account or the participant's account number (if available) receiving a direct rollover.)

For rollovers the operator needs to be able to enter distribution check mailing address of either the custodian or the member.

The operator may see if an accepted check was a replacement check and which check number it replaced.

An operator may remove a statement from the payroll batch.

An operator may regenerate exception and excluded statements.

The operator may view a summary of checks contained in a special payroll batch.

The automated clearing house (ACH) payments UI functions 1928 may include the following action and/or display functions:

Check values may be previewed before printing.

An operator may create a comment that is <=250 characters to print on an individual statement in the distribution payroll run.

An operator may create a comment<=250 characters to print globally on all statements in a payroll run.

The pay-period is clearly shown on related distribution payroll pages.

The operator may create checks allocated for support or garnishment without the payees name and address being set-up as a customer.

The payroll register report UI functions 1930 may include the following action and/or display functions:

Display the report as read only.

The operator may print the report from the display or export the report to Excel for other purposes The operator may re-request the generation of a report for any accepted payroll.

The pay period history report UI functions 1932 may include the following action and/or display functions:

The operator may indicate time period parameters (to and from) when requesting this report.

The operator may request this report for a single member, or for all participants with dollars on deposit in accrual accounts (including suspense).

Suspense participants may be excluded or included when requesting a report for all participants The operator may view this report, save to a file, or send to a printer.

A report may be ordered by current name for printing, to assist with PT filing methodology.

The operator may easily navigate through a report containing all accrual accounts.

May request a re-print of a single page, or a range of pages.

Provide a parameter to collapse the display view and printed report to sum the transaction detail by pay period into a single line per pay period. In other words, if there are payroll, buyback, and adjustment transactions, then either display them as separate lines or rolled-up depending upon the display mode (detail or summary)

The payment summary report UI functions 1934 may include the following action and/or display functions:
- The operator may request the report by date parameter.
- The operator may request the report for an individual customer or all customers.
- The operator may choose to view and print customer subtotals and grand total or all detail.
- The operator may save this report to a file, or send directly to a printer.

The check reconciliation and paid check report UI functions 1936 1934 may include the following action and/or display functions:
- Generate header information and report content including check number, unique payee identifier (currently defined as SSN), last name, first name, middle name, amount of check, date issued (from the PT system), date paid, total amount paid, grand total of paid amounts, and the total number of checks on the report sorted by number in ascending order.

The outstanding and stale check report UI functions 1938 may include the following action and/or display functions:
- The operator may request the report as of any date and the report will include all unpaid checks where the paycheck dates is <=as of date The COLA report UI functions 1940 may include the following action and/or display functions:
- Generate header information and report content including COLA group, payee last name, payee first name, middle initial, amount of check, SSN, distribution account type, amount of basic allowance prior to last COLA, amount of previous COLA adjustment, amount of previous basic allowance plus COLA, % COLA increase, dollar amount of COLA increase, previous COLA+COLA Increase, new monthly allowance (previous basic allowance and COLA plus new COLA), By COLA Group: Show COLA group number and related date parameter (ex: 33 (01/02/2003-01/01/2004), subtotal the number of payees in report, subtotal the amounts of previous basic allowance plus COLA, subtotal the amounts of new COLA, subtotal the amounts of new monthly allowance, and grand total the subtotals at the end of the report. Show all the subtotals and the grand total at the end.

The member detail report UI functions 1942 may include the following action and/or display functions:
- The operator may request this report for an individual or all members in the system.
- The operator may request the report as of a pay period and year. Or with no pay period to get the current balance in the accrual accounts.

The annual statement report UI functions 1944 may include the following action and/or display functions:
- The operator requests this report by year.
- The operator may request this report for prior years.
- The operator may request this report for an individual or all customers in the system.
- If requested for all customers, there may be a mechanism to re-print one, some or all of the statements in the event of a printing failure.
- This report will always be printed. There is no need to view the report on-line or save it.

The salary history report UI functions 1946 may include the following action and/or display functions:
- The report is requested for an individual customer in context.

The estimated unmodified report UI functions 1948 may include the following action and/or display functions:
- The report may be requested from the estimator page for the customer in context.
- The operator may choose which version to create.
- The report may be viewed before printing.

The estimated benefit calculations factors report UI functions 1950 may include the following action and/or display functions:
- The operator may request this report from the estimator page for the customer retirement calculation in context
- The operator may view the report on-line and/or print it.

The reciprocity UI functions 1952 may include the following action and/or display functions:
- Selection of a reciprocal entity name automatically populates the (pre-defined) verification contact name and address.

The tax withholding UI functions 1954 may include the following action and/or display functions:
- The operator may add and modify tax withholding information for a participant.
- The operator has the flexibility to enter two distribution codes for a single distribution that may be used together, if applicable.
- The operator may enter the payee's withholding election for FIT & SIT separately.
- The operator may enter the number of exemptions for FIT & SIT separately.
- The operator may specify a flat amount to be withheld for SIT or an additional amount plus the tax calculated from the state withholding tables
- The operator may enter an amount to be withheld for federal tax in addition to the amount determined from the federal tax tables. This is the ONLY instance where a recipient may specify an amount of tax to be withheld.
- The operator may enter the withholding elections for FIT & SIT separately
- The total of FIT & SIT deductions are displayed on the page. They may not be modified.
- Provide the capability of recording the dates that forms were signed for federal and state withholding elections.

UI Validation
- Both, either, or neither a federal or a state withholding election may be filed;
- defaults will apply automatically when either or both are "missing":
  - W-4P federal withholding election options (UI default): exempt (no), allowances (3), marital status (married), and additional amount (0). Exempt is mutually exclusive with the other three options. Date signed is a crucial field. The user may not be allowed to commit this election without a date.
  - DE 4P state withholding election options (UI default): exempt (no), allowances (3), estimated deduction allowances (0), marital status (married), additional amount ($0.00), and designated amount (null/empty). Exempt is mutually exclusive with all other options. Designated amount is mutually exclusive with all other options. Date signed is a crucial field. The user may not be allowed to commit this election without a date.
  - "Federal Custom % or $" and "State Custom % or $" election options (UI default): percentage and amount
  - Indicate on UI that if both options are set, first the "Percentage" will be calculated based on gross taxable earnings and then the "Amount" will be added.

The form 1099R UI functions 1956 may include the following action and/or display functions:

The operator may view a history of 1099Rs generated for a client.

The operator may select a 1099R from a client's history to reprint a duplicate or correction.

The operator may view whether or not a form was generated, printed, corrected, or voided.

The operator may set and change Corrected and Voided flags.

The operator may elect to generate a single, a range or all 1099Rs for filing with the IRS.

The operator may select the tax year for generating 1099Rs

An operator may cancel or regenerate a single, range or all 1099Rs after generation but prior to acceptance.

An operator may modify data for inclusion in a single 1099R after generation but prior to acceptance.

The system will set the accepted flag when the user accepts the 1099R file as ready for filing with the IRS.

The generated file will be saved to a designated location when the operator accepts as ready to file.

An operator may void a 1099R after acceptance.

The operator may view the generated 1099R data in an on-line report before electing to print or before electing to accept.

The operator may select the printer for printing 1099Rs.

The operator may select to print or re-print a single, a range or all 1099Rs.

The operator may accept the printed 1099Rs as completed.

FIG. 20 is a diagram illustrating the set of retirement UI functions 1546 shown in FIG. 15 according to one embodiment of the invention. The set of retirement business UI functions 1546 includes at least one of estimator page calculations and conversions UI functions 2010, calculations page calculations and conversions UI functions 2020, unmodified page calculations and conversions UI functions 2030, option one calculations and conversions UI functions 2040, option two calculations and conversions UI functions 2050, option three calculations and conversions UI functions 2060, estimate/calculation conversion UI functions 2070, re-hire calculations and conversions UI functions 2080, refund of contributions UI functions 2090, and reserves calculations and conversions UI functions 2095.

The estimator page calculations and conversions UI functions 2010 may include the following action and/or display functions:

The operator may choose to estimate a retirement or a disability allowance. The default is service retirement.

If a customer is in context the system will show if an eligible spouse exists by calculating if the length of marriage is =>1 year before the retirement date.

If the customer is in context, the system will reflect the following profile information on the estimator screens: SSN, Customer name, current employer group or if terminated the last employer group, and whether the most recent accrual account status is Active, Reserve, Suspense, Reciprocal Reserve and if the employee is currently on LWOP, or closed if a refund was taken.

If the customer is in context, the system will pre-populate: Date of most recent employer payroll feed, last reported monthly salary, system-determined high salary/compensation for consecutive period, DOB, hire date, plan entry date, gender, normal (planned) hours worked in the pay period, current PTSC (as of the most recent payroll feed), and estimated PTSC per the retirement date unless a termination date is entered—then use the termination date If the customer is in context, and a DOB exists for the customer, the system pre-populate a field labeled Retirement Date with: the date the customer attains =>50 years of age and 5 PTSC but not before the current date, ability to indicate not to project PTSC (LWOP scenario), and the customer age as of the date shown in the retirement date field.

Show the first date the customer may retire and why.

The operator may enter estimated PTSC that overrides the system-determined estimated credits.

The operator may enter/modify a retirement date.

If the customer is in context, no longer had an active accrual account and a Termination date is in the system then the field labeled termination date will be pre-populated with the most current termination date received from employer payroll.

The operator may enter/modify a termination date.

If no customer is in context the final calculated monthly average defaults to 12.

The operator may change the Final Calculated Monthly Average whether or not the customer is in context.

If the customer is in context the system will display Formula Group Details

The operator may override the factor, cap, or final salary/compensation for modeling different scenarios If the customer is in context the system will display final compensation (see glossary for a mock-up) and these columns of data: starting & ending dates (mm/dd/yyyy)—over what period an average monthly salary/compensation was paid (show start/end date by each different salary amount within the system determined consecutive months period); months—the number of months (in whole numbers and fractions to three decimals) of each period shown, salary/compensation—the average monthly salary/compensation for the period described by the start/end dates in the Salary field(s), and a system provided indication when pick-up was used in the calculation and the pick-up percent Sum the months to reflect the month factor (12 or 36)

Calculate and display the weighted average of the salaries/compensation shown by period.

The operator may enter/override data in the Salary and/or Start/End average compensation period field(s);

System recalculated the months when changes are made in start/ending periods.

The system will truncate the number of months shown for highest salary/compensation so the sum equals the 12 or 36 month factor chosen for the estimation.

The operator may easily request/view/print an Estimate, return to the form to make modifications and re-request, view, and print with changes reflected before saving an estimate.

May easily navigate to/from: unmodified estimate report, report with final compensation, option calculations, generic calculations, and reports.

The calculations page calculations and conversions UI functions 2020 may include the following action and/or display functions:

The System Pre-Populates the Following Information (if Applicable/Available):

Operator entered/modified estimated social security benefit (dollar value provided by the customer to the pension trust)

Survivor/Beneficiary Information: Whether or not there is a survivor/beneficiary, name of the survivor/beneficiary, birth date of the survivor/beneficiary, age of the Survivor/Beneficiary, and an indication if the Survivor/Beneficiary is an Eligible survivor Factors used in calculation of benefits and options: age at retirement, age nearest birthday, retirement age factor, annuity factor, option one annuity factor, option One Reduction Factor, option two factor (100% continuance), option three factor (50% continuance), and social security factor.

Calculated values: Final Compensation (from estimator form/process), Retirement Service Years (Total PTSC from Membership in the SLO county Retirement Plan), Calculated Pension Portions for Temporary Annuity, Personal Retirement Contributions to Date of Retirement, Employee Additional Contributions to Date of Retirement, and Total Account Balance Including Employee Additional The operator may add a comment to the estimate that prints on the estimate and to the file copy.

The unmodified page calculations and conversions UI functions 2030 may include the following action and/or display functions:

Data fields (values displayed to two decimals): Total Unmodified Retirement Allowance (100%), Total Unmodified Retirement Allowance (50%), Current Service Annuity (100%), Current Service Annuity (50%), Additional Contribution, Calculated Pension Portion, Eligible Survivor 50% Continuance, Social Security Estimate, Social Security Estimate, Pension Portion, (Social Security OR Pension Portion) Increase, (Social Security OR Pension Portion) Decrease, Total Before 62 Allowance, Total After 62 Allowance.

The operator may modify the value in the Total Unmodified Retirement Allowance (100%) field.

The option one calculations and conversions UI functions 2040 may include the following action and/or display functions:

Display values in the following Option One Calculations fields as either * dollars and cents without a dollar sign or ** number rounded to two decimal places: Option One Current Service Annuity *, Option One Total Allowance*, Option One Accumulated Normal Contributions*, Option One Monthly Contribution Repayment*, Automatic Continuance (Only Eligible Survivor)*, and Remaining Balance to Zero (Years)**

Display values as dollars and cents without a dollar sign in the following Temporary Annuity Options fields: Total before age 62 allowance and total after age 62 allowance.

The option two calculations and conversions UI functions 2050 may include the following action and/or display functions:

Display values in the following Option Two Calculations fields as dollars and cents without a dollar sign: Option Two Eligible Survivor Allowance, Continuance to Eligible Survivor, Option Two Total Allowance, and Continuance to Beneficiary Display values as dollars and cents without a dollar sign in the following Temporary Annuity Options fields: Total Before Age 62 Allowance and Total After Age 62 Allowance The option three calculations and conversions UI functions 2060 may include the following action and/or display functions:

Display values in the following Option Three Calculations fields as dollars and cents without a dollar sign: Option Three Eligible Survivor Allowance, Continuance to Eligible Survivor, Option Three Total Allowance, and Continuance to Beneficiary Display values as dollars and cents without a dollar sign in the following Temporary Annuity Options fields: Total Before Age 62 Allowance, and Total After Age 62 Allowance The estimate/calculation conversion UI functions 2070 may include the following action and/or display functions:

The operator may remove any previous indication that an estimate was Final or the one used to print election documents.

After a retirement calculation has been converted to a distribution, the operator may return at any time in the future to view/print the original Estimate or Election documents, reports and calculations associated with that calculation.

The re-hire calculations and conversions UI functions 2080 may include the action and/or display functions to notify a rehire, review pay period history, calculate PTSC for the laid-off period.

The refund of contributions UI functions 2090 may include the following action and/or display functions:

The operator may select the function to initiate a refund when the customer is in context.

When the refund function is selected the system will provide the following validations: indicate if the pre-conditions are not met and provide links to areas that need to be finalized, indicate if there is a pending retirement calculation, indicate if there is an unsatisfied Buyback contract and provide a link to the buyback account, show any high-visibility notes that has been entered on the customer, and show a list of reciprocal or reciprocal reserve account(s) and provide a link to the accounts The validations page should also show a summary of contributions by accrual account and contribution type, including totals.

The operator may elect to refund Normal Contributions as an indication to the system to convert all Normal and Additional contributions into a refund. This indicator is disabled if there is a pending retirement for the customer.

The operator may specify if the refund will be issued as a rollover and/or check. (Link to payment channel assumes the operator has distribution manager rights). Operator may specify tax codes and payment channels for each check created (one customer may have more than one check issued—e.g., cash out and rollover)

The operator may specify the distribution payroll batch in which the refund payment will be included.

The operator may indicate if refunding regular accrual accounts or an alternate payee account. If there is more than one Alt. Payee account the operator may specify the account to be refunded.

The reserves calculations and conversions UI functions 2095 may include the following action and/or display functions:

Display values in the following Reserve Calculations fields as dollars and cents without a dollar sign: Current Service Annuity Reserve, Pension Reserve, and Beneficiary Reserve Display values in the following Transfer These Reserves fields as dollars and cents without a dollar sign: Member Deposits, Member Deposits with Lifetime Annuity, and Current Reserves Add a help message on Member Deposits: Transfer from member Deposits into the Retirees & Beneficiaries Reserve)

Add a help message on Member Deposits with Lifetime Annuities: Transfer the entire member account including Employee Additional Contributions if Member elects a Lifetime Annuity)

Add a help message on Current Reserves: Transfer Current Service and Beneficiary Reserves into the Retirees & Beneficiary Reserves.

FIG. 21 is a diagram illustrating the set of employment and payroll UI functions 1550 shown in FIG. 15 according to one embodiment of the invention. The set of employment and payroll interface business UI functions 1550 comprises at least automated UI functions 2105 and non-automated payroll UI functions 2110.

The data import process—automated payroll UI functions 2105 may include the following action and/or display functions:

Stage Manager

Need to be able to see all the currently staged data imports.

Each stage type will have a different excel export that the operator may view.

Ability to reject a staged data import—All the staged data is then removed from the stage.

Ability to accept staged data import—All the staged data is then removed from the stage and inserted into the production database going through the Import Rules process from above.

When accepting a data feed, if there are errors and/or warning messages associated with the feed, then the Operator will be prompted with a message indicating that there are errors and/or warnings and do they want to continue acceptance of this feed.

Acceptance may only occur if Pay Period information is valid.

The Stage Report will generate messages under the following conditions: Pay Period information is invalid (employer, year, number, start date, and/or end date), Missing SSN, Missing First Name, Missing Last Name, Missing Plan Entry Date, Missing Hire Date, Missing Contribution Rate, Missing Hourly Salary, Missing Birth Date, Contribution amounts do not match rate, Posting transactions against Closed, Suspense, or Reserve accrual account, Invalid Employer Group, Missing Bargaining Unit, Missing Member Class, and Invalid Event Type.

The non-automated payroll (NAP) UI functions 2110 may include the following action and/or display functions:

The NAP template provides fields/dropdowns for entering: Employer, Data Creation Date, Pay Period Start Date, Pay Period Stop Date, Pay Period Number, and Pay Period Year.

For each employee, fields/dropdowns are provided for: SSN, Employee ID, First Name, Middle Name, Last Name, Birth Date, Gender, Hire Date, Termination Date, and Plan Entry Date.

One or more addresses: Address Type, Address Line 1, Address Line 2, City, State, and Postal Code.

One or more transactions: Pay Date, Title, Department, Bargaining Unit, Member Class Name, Normal Hours, Hours Worked, Period Gross Pay, Hourly Salary, Contribution Rate, and one or more line item types and amounts One or more events: Event Type, Start Date, Stop Date, Post Date, and Amount.

FIG. 22 is a diagram illustrating the set of self-service UI functions 1560 shown in FIG. 15 according to one embodiment of the invention. The self-service business UI functions 1560 includes at least one of self-service (SS) log-on UI functions 2210; SS buyback calculations UI functions 2220; SS rate and benefits calculators UI functions 2230; SS client personal data UI functions 2240; SS inquiries, forms, and static data UI functions 2250; and SS look-and-feel UI functions 2260.

The self-service (SS) log-on UI functions 2210 may include the following action and/or display functions:

Provide a message if on-line registration is unsuccessful

Provide a message if the system may not authenticate the SS client during the registration process.

Password field only displays a position character and not the password (usually a "*" character, but may be a "●")

A PT operator may reset the password for a self-service client.

The SS buyback calculations UI functions 2220 may include the following action and/or display functions:

The system displays the following for a completed estimate: (see the multi-year payment options summaries that are currently produced)

Provide a message that the estimate is not saved and prompting the operator to print when the operator elects to exit the estimate function or re-estimate.

After a request for buyback is submitted provide a message that details the next steps, what to expect.

The SS rate and benefits calculators UI functions 2230 may include the following action and/or display functions:

Rate Calculator:

The visitor may be able to set or enter the following fields on the rate calculator page: Employer, Member class, Bargaining unit, Date of birth, and Plan entry date.

The rate calculator will display as output: the contribution rate and the plan entry age given the information input by the visitor.

Benefits/Payment Calculator:

When a customer is in context (self-service user logged in)—the estimate screen may pre-populate with the customer's information.

The visitor and/or customer will be able to enter or change the following information: Bargaining Unit, Age at Retirement, Total Years of Service, Final Compensation The benefits calculator will display as output: the estimated monthly retirement allowance.

The SS client personal data UI functions 2240 may include the following action and/or display functions:

A logged in self service user will be able to view the following information for their own account(s): self service user ID, customer profile of name, SSN, address, phone number(s), email addresses, plan entry date, birth date, accrual account information; accrual transaction history; accrual employment events; distribution account information and summary; check history; 1099R history; annual report; member detail report (current); buyback contracts (type, total payments, remaining balance, remaining payments, recurring payment amount).

A logged in self service user will be able to modify the following information: Their self service user id and password.

The SS inquiries, forms, and static data UI functions 2250 may include the following action and/or display functions:

The self service site may allow for link(s) to Adobe Acrobat on pages that contain PDF documents.

The self service site may allow for links/pages for copyright, terms of use, and privacy policy information The self service site may provide easy navigation between functional areas of the site.

Self-service users may have the ability to enter information in electronic inquiry/request forms. Electronic forms include: request for retirement estimate, and multi-purpose change form—change of address.

All email inquiries will be made via web forms (not mail to links).

The SS look-and-feel UI functions 2260 may include the following action and/or display functions:

The user may print whatever is in the browser.

The first seven digits of the SSN will be blocked from view in any display.

The user may select, open, fill out and submit forms.

The user may initiate e-mail inquiries to the pension trust from the web-site.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments may be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that may store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that may propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but may be practiced with modification and alteration within the spirit and scope of the appended claims. The description is thus to be regarded as illustrative instead of limiting.

What is claimed is:

1. A system comprising:

a user interface (UI) module executed by a computer processor coupled to a client administering module, a communication interface, an account manager, an employment and payroll interface, a self-service Website, and a business rule processing module to interact with a user through a set of UI functions in a session related to pension accounts and retirement benefits of a plurality of customers, at least one of the UI functions including a UI action and a UI display, the user belonging to an operator group or a customer group, the set of UI functions including a set of self-service UI functions having a benefits calculator to display an estimated monthly retirement allowance based on entered information including at least one of bargaining unit, age at retirement, total years of service and final compensation; and an employment and payroll database coupled to the employment and payroll interface to store employment and payroll information of the customers used by the UI module.

2. The system of claim 1 wherein the set of UI functions further comprises at least a set of client UI functions; a set of communication UI functions; a set of account manager UI functions including at least one of a set accrual UI functions, a set of benefits UI functions, and a set of retirement UI functions; and a set of employment and payroll UI functions.

3. The system of claim 2 wherein the set of client UI functions comprises at least one of address functions, contact information functions, customer profile functions, pending member functions, link relationships functions, and search function functions.

4. The system of claim 2 wherein the set of communication UI functions comprises at least one of forms and letters functions, look-up and data reference manager functions, log-on and password functions, customer notes functions, operator and system notifications functions, pension trust operator functions, and operator security functions.

5. The system of claim 2 wherein the set of accrual UI functions comprises at least one of distribution account functions, and accrual accounts interest functions.

6. The system of claim 2 wherein the set of benefits UI functions comprises at least one of allocations functions, banking information functions, beneficiary information functions, cost-of-living-adjustment (COLA) functions, death recording functions, health insurance deductions functions, distribution payroll processing functions, physical distribution payroll checks functions, non-recurring special payroll checks functions, automated clearing house (ACH) payments functions, payroll register report functions, pay period history report functions, payment summary report functions, check reconciliation and paid check report functions, outstanding and stale check report functions, COLA report functions, member detail report functions, annual statement report functions, salary history report functions, estimated unmodified report functions, estimated benefit calculations factors report functions, reciprocity functions, tax withholding functions, and form 1099R functions.

7. The system of claim 2 wherein the set of retirement UI functions comprises at least one of estimator page calculations and conversions functions, unmodified page calculations and conversions functions, first option calculations and conversions functions, second option calculations and conversions functions, third option calculations and conversions functions, estimate/calculation conversion functions, re-hire calculations and conversions functions, refund of contributions functions, and reserves calculations and conversions functions.

8. The system of claim 2 wherein the set of employment and payroll interface UI functions comprises at least automated payroll functions and non-automated payroll functions.

9. The system of claim 1 wherein the self-service UI functions further comprises at least one of self-service (SS) log-on functions; SS buyback calculations functions; SS rate and benefits calculators functions SS client personal data functions; SS inquiries, forms, and static data functions; and SS look-and-feel functions.

10. A computer-implemented method comprising:
interacting with a user through a set of UI functions in a session via a server related to pension accounts and retirement benefits of a plurality of customers using a UI module coupled to a client administering module, a communication interface, an account manager, an employment and payroll interface, and a self-service Website, at least one of the UI functions including a UI action and a UI display, the user belonging to an operator group or a customer group, interacting through the set of UI functions comprising interacting via a set of self-service UI functions comprising displaying an estimated monthly retirement allowance based on entered information including at least one of bargaining unit, age at retirement, total years of service and final compensation; and
using employment and payroll information of the customers stored in an employment and payroll database coupled to the employment and payroll interface.

11. The method of claim 10 wherein interacting via a set of UI functions comprises interacting via at least a set of client UI functions; a set of communication UI functions; a set of account manager functions including at least one of a set accrual UI functions, a set of benefits UI functions, and a set of retirement UI functions; and a set of employment and payroll interface UI functions.

12. The method of claim 11 wherein interacting via the set of client UI functions comprises interacting via at least one of address functions, contact information functions, customer profile functions, pending member functions, link relationships functions, and search function functions.

13. The method of claim 11 wherein interacting via the set of communication UI functions comprises interacting via at least one of forms and letters functions, look-up and data reference manager functions, log-on and password functions, customer notes functions, operator and system notifications functions, pension trust operator functions, and operator security functions.

14. The method of claim 11 wherein interacting via the set of accrual UI functions comprises interacting via at least one of distribution account functions, and accrual accounts interest functions.

15. The method of claim 11 wherein interacting via the set of benefits UI functions comprises interacting via at least one of allocations functions, banking information functions, beneficiary information functions, cost-of-living-adjustment (COLA) functions, death recording functions, health insurance deductions functions, distribution payroll processing functions, physical distribution payroll checks functions, non-recurring special payroll checks functions, automated clearing house (ACH) payments functions, payroll register report functions, pay period history report functions, payment summary report functions, check reconciliation and paid check report functions, outstanding and stale check report functions, COLA report functions, member detail report functions, annual statement report functions, salary history report functions, estimated unmodified report functions, estimated benefit calculations factors report functions, reciprocity functions, tax withholding functions, and form 1099R functions.

16. The method of claim 11 wherein interacting via the set of retirement UI functions comprises interacting via at least one of estimator page calculations and conversions functions, unmodified page calculations and conversions functions, first option calculations and conversions functions, second option calculations and conversions functions, third option calculations and conversions functions, estimate/calculation conversion functions, re-hire calculations and conversions functions, refund of contributions functions, and reserves calculations and conversions functions.

17. The method of claim 11 wherein interacting via the set of employment and payroll interface UI functions comprises interacting via at least automated payroll functions and non-automated payroll functions.

18. The method of claim 10 wherein interacting via the self-service UI functions further comprises interacting via at least one of self-service (SS) log-on functions, SS buyback calculations functions, SS rate and benefits calculators functions, SS client personal data functions, SS inquiries, forms, and static data functions, and SS look-and-feel functions.

19. An article of manufacture comprising:
a machine-accessible storage medium including data that, when accessed by a machine, cause the machine to perform operations comprising:
interacting with a user via a set of UI functions related to pension accounts and retirement benefits of a plurality of customers to process a transaction using a business rule processing module coupled to at least one of a client administering module, a communication interface, an account manager, an employment and payroll interface, and a self-service Website, the user belonging to an operator group or a customer group; and
using employment and payroll information of the customers stored in an employment and payroll database coupled to the employment and payroll interface;
wherein the data causing the machine to perform interacting via the set of UI functions comprise data that, when accessed by the machine, cause the machine to perform operations comprising interacting via a set of self-service UI functions comprising displaying an estimated monthly retirement allowance based on entered information including at least one of bargaining unit, age at retirement, total years of service and final compensation.

20. The article of manufacture of claim 19 wherein the data causing the machine to perform interacting via the set of UI functions further comprises data that, when accessed by a machine, cause the machine to perform operations comprising interacting via at least a set of client UI functions; a set of communication UI functions; a set of account manager functions including at least one of a set accrual UI functions, a set of benefits UI functions, and a set of retirement UI functions; and a set of employment and payroll interface UI functions.

21. The article of manufacture of claim 20 wherein the data causing the machine to perform interacting via the set of client UI functions comprises data that, when accessed by a machine, cause the machine to perform operations comprising interacting via at least one of address functions, contact information functions, customer profile functions, pending member functions, link relationships functions, and search function functions.

22. The article of manufacture of claim 20 wherein the data causing the machine to perform interacting via the set of communication UI functions comprises data that, when accessed by a machine, cause the machine to perform operations comprising interacting via at least one of forms and letters functions, look-up and data reference manager functions, log-on and password functions, customer notes functions, operator and system notifications functions, pension trust operator functions, and operator security functions.

23. The article of manufacture of claim 20 wherein the data causing the machine to perform interacting via the set of accrual UI functions comprises data that, when accessed by a machine, cause the machine to perform operations comprising interacting via at least one of distribution account functions, and accrual accounts interest functions.

24. The article of manufacture of claim 20 wherein the data causing the machine to perform interacting via the set of benefits UI functions comprises data that, when accessed by a machine, cause the machine to perform operations comprising interacting via at least one of allocations functions, banking information functions, beneficiary information functions, cost-of-living-adjustment (COLA) functions, death recording functions, health insurance deductions functions, distribution payroll processing functions, physical distribution payroll checks functions, non-recurring special payroll checks functions, automated clearing house (ACH) payments functions, payroll register report functions, pay period history report functions, payment summary report functions, check reconciliation and paid check report functions, outstanding and stale check report functions, COLA report functions, member detail report functions, annual statement report functions, salary history report functions, estimated unmodified report functions, estimated benefit calculations factors report functions, reciprocity functions, tax withholding functions, and form 1099R functions.

25. The article of manufacture of claim 20 wherein the data causing the machine to perform interacting via the set of retirement UI functions comprises data that, when accessed by a machine, cause the machine to perform operations comprising interacting via at least one of estimator page calculations and conversions functions, unmodified page calculations and conversions functions, first option calculations and conversions functions, second option calculations and conversions functions, third option calculations and conversions functions, estimate/calculation conversion functions, re-hire calculations and conversions functions, refund of contributions functions, and reserves calculations and conversions functions.

26. The article of manufacture of claim 20 wherein the data causing the machine to perform interacting via the set of employment and payroll interface UI functions comprises data that, when accessed by a machine, cause the machine to perform operations comprising interacting via at least automated payroll functions and non-automated payroll functions.

27. The article of manufacture of claim 19 wherein the data causing the machine to perform interacting via the self-service UI functions further comprises data that, when accessed by a machine, cause the machine to perform operations comprising interacting via at least one of self-service (SS) log-on functions, SS buyback calculations functions, SS rate and benefits calculators functions, SS client personal data functions, SS inquiries, forms, and static data functions, and SS look-and-feel functions.

28. A system comprising:
a production server having a production retirement administration and distribution (RAD) module;
a replicated server having a replicated RAD module, the replicated RAD module being similar to the production RAD module, the production and replicated RAD modules implementing a RAD system (RADS);
at least a user coupled to the production server to access the production RAD module via a first network, the user belonging to an operator group or a customer group; and
a plurality of customers coupled to the replicated server to access the replicated RAD module via a second network;
wherein the RADS comprises:
a user interface (UI) module coupled to a client administering module, a communication interface, an account manager, an employment and payroll interface, a self-service Website, and a business rule processing module to interact with an operator through a set of UI functions in a session related to pension accounts and retirement benefits of a plurality of customers, at least one of the UI functions including a UI action and a UI display, the set of UI functions including a set of self-service UI functions having a benefits calculator to display an estimated monthly retirement allowance based on entered information including at least one of bargaining unit, age at retirement, total years of service and final compensation; and
an employment and payroll database coupled to interface coupled to the employment and payroll interface to store employment and payroll information of the customers used by the UI module.

29. The system of claim 28 wherein the set of UI functions further comprises at least a set of client UI functions; a set of communication UI functions; a set of account manager functions including at least one of a set accrual UI functions, a set of benefits UI functions, and a set of retirement UI functions; and a set of employment and payroll interface UI functions.

30. The system of claim 29 wherein the set of client UI functions comprises at least one of address functions, contact information functions, customer profile functions, pending member functions, link relationships functions, and search function functions.

31. The system of claim 29 wherein the set of communication UI functions comprises at least one of forms and letters functions, look-up and data reference manager functions, log-on and password functions, customer notes functions, operator and system notifications functions, pension trust operator functions, and operator security functions.

32. The system of claim 29 wherein the set of accrual UI functions comprises at least one of distribution account functions, and accrual accounts interest functions.

33. The system of claim 29 wherein the set of benefits UI functions comprises at least one of allocations functions, banking information functions, beneficiary information functions, cost-of-living-adjustment (COLA) functions, death recording functions, health insurance deductions functions, distribution payroll processing functions, physical distribution payroll checks functions, non-recurring special payroll checks functions, automated clearing house (ACH) payments functions, payroll register report functions, pay period history report functions, payment summary report functions, check reconciliation and paid check report functions, outstanding and stale check report functions, COLA report functions, member detail report functions, annual statement report functions, salary history report functions, estimated unmodified report functions, estimated benefit calculations factors report functions, reciprocity functions, tax withholding functions, and form 1099R functions.

34. The system of claim 29 wherein the set of retirement UI functions comprises at least one of estimator page calculations and conversions functions, unmodified page calculations and conversions functions, first option calculations and conversions functions, second option calculations and conversions functions, third option calculations and conversions functions, estimate/calculation conversion functions, re-hire calculations and conversions functions, refund of contributions functions, and reserves calculations and conversions functions.

35. The system of claim 29 wherein the set of employment and payroll interface UI functions comprises at least automated payroll functions and non-automated payroll functions.

36. The system of claim 28 wherein the self-service UI functions further comprises at least one of self-service (SS) log-on functions, SS buyback calculations functions, SS rate and benefits calculators functions, SS client personal data functions, SS inquiries, forms, and static data functions, and SS look-and-feel functions.

\* \* \* \* \*